US012803709B2

(12) United States Patent
Guo et al.

(10) Patent No.: US 12,803,709 B2
(45) Date of Patent: Nov. 17, 2026

(54) MULTI-BIT FEEDBACK VIA A SIDELINK FEEDBACK CHANNEL

(71) Applicant: QUALCOMM Incorporated, San Diego, CA (US)

(72) Inventors: Shaozhen Guo, Beijing (CN); Changlong Xu, Beijing (CN); Jing Sun, San Diego, CA (US); Xiaoxia Zhang, San Diego, CA (US); Luanxia Yang, Beijing (CN); Siyi Chen, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 18/710,988

(22) PCT Filed: Jan. 27, 2022

(86) PCT No.: PCT/CN2022/074195

§ 371 (c)(1),
(2) Date: May 16, 2024

(87) PCT Pub. No.: WO2023/141853

PCT Pub. Date: Aug. 3, 2023

(65) Prior Publication Data

US 2025/0015930 A1 Jan. 9, 2025

(51) Int. Cl.
*H04L 1/1607* (2023.01)
*H04L 5/00* (2006.01)
*H04W 72/25* (2023.01)

(52) U.S. Cl.
CPC .......... *H04L 1/1614* (2013.01); *H04L 5/0055* (2013.01); *H04W 72/25* (2023.01)

(58) Field of Classification Search
None
See application file for complete search history.

(56) References Cited

U.S. PATENT DOCUMENTS 12,058,649 B2 * 8/2024 Zhou .................... H04L 1/1854
2019/0342053 A1 * 11/2019 Peng .................... H04L 1/1607
(Continued)

FOREIGN PATENT DOCUMENTS

EP 3876460 A1 9/2021
WO WO-2021028565 A2 2/2021
(Continued)

OTHER PUBLICATIONS

Supplementary European Search Report—EP22922702—Search Authority—Munich—Jan. 23, 2026.
(Continued)

*Primary Examiner* — Faiyazkhan Ghafoerkhan
(74) *Attorney, Agent, or Firm* — Holland & Hart LLP/Qualcomm

(57) ABSTRACT

This disclosure provides systems, methods and apparatus, including computer programs encoded on computer storage media, for multi-bit feedback via a sidelink feedback channel. In some aspects, a first user equipment (UE) and a second UE may support a physical sidelink feedback channel (PSFCH) design that is capable of conveying multi-bit feedback across multiple resource blocks. For example, the first UE may monitor for one or more sidelink data messages from the second UE and may transmit, to the second UE over multiple resource blocks of a PSFCH, a feedback message indicating multiple feedback bits associated with the sidelink data messages. The first UE may indicate or otherwise convey the multiple feedback bits via various sequence types or coding schemes. Additionally, or alternatively, the first UE and the second UE may support a resource selection scheme involving one or more parameters associated with conveying multi-bit feedback over a PSFCH.

30 Claims, 14 Drawing Sheets

(56) References Cited

U.S. PATENT DOCUMENTS

| | | | | |
|---|---|---|---|---|
| 2021/0105842 | A1* | 4/2021 | Cheng | H04L 5/0033 |
| 2021/0168574 | A1* | 6/2021 | Zhang | H04L 5/0048 |
| 2021/0243841 | A1* | 8/2021 | Yasukawa | H04L 1/1864 |
| 2021/0336728 | A1* | 10/2021 | Selvanesan | H04L 1/1896 |
| 2022/0046677 | A1* | 2/2022 | Talarico | H04W 72/23 |
| 2022/0182979 | A1* | 6/2022 | Freda | H04W 72/02 |
| 2022/0210768 | A1* | 6/2022 | Zhou | H04W 72/20 |
| 2023/0247654 | A1* | 8/2023 | Zhang | H04W 72/20 370/329 |
| 2024/0323922 | A1* | 9/2024 | Freda | H04W 72/02 |
| 2024/0397484 | A1* | 11/2024 | Zhou | H04W 72/0446 |
| 2025/0015930 | A1* | 1/2025 | Guo | H04L 1/1614 |

FOREIGN PATENT DOCUMENTS

| | | | |
|---|---|---|---|
| WO | WO-2021037245 | A1 | 3/2021 |
| WO | WO-2021189428 | A1 | 9/2021 |
| WO | WO-2021242030 | A1 | 12/2021 |

OTHER PUBLICATIONS

International Search Report and Written Opinion—PCT/CN2022/074195—ISA/EPO—Oct. 21, 2022.

Spreadtrum Communications: “Discussion on NR V2X Physical Layer Procedure”, 3GPP Draft; R1-1902724, 3rd Generation Partnership Project, Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019, 7 Pages, XP051600419, The Whole Document.

Supplementary Partial European Search Report—EP22922702—Search Authority—The Hague—Oct. 29, 2025.

* cited by examiner

1400

MULTI-BIT FEEDBACK VIA A SIDELINK FEEDBACK CHANNEL

CROSS REFERENCE

The present application is a 371 national stage filing of International PCT Application No. PCT/CN2022/074195 by GUO et al. entitled "MULTI-BIT FEEDBACK VIA A SIDELINK FEEDBACK CHANNEL," filed Jan. 27, 2022, which is assigned to the assignee hereof, and which is expressly incorporated by reference in its entirety herein.

TECHNICAL FIELD

This disclosure relates to wireless communications, including multi-bit feedback via a sidelink feedback channel.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a first user equipment (UE). The method may include receiving, from a second UE, one or more control signals scheduling one or more sidelink data messages, transmitting, to the second UE over a set of multiple resource blocks of a sidelink feedback channel resource, a feedback message associated with the one or more sidelink data messages, the feedback message indicating a set of multiple feedback bits associated with the one or more sidelink data messages, and communicating with the second UE in accordance with the set of multiple feedback bits associated with the one or more sidelink data messages.

Another innovative aspect of the subject matter described in this disclosure can be implemented in an apparatus for wireless communications at a first UE. The apparatus may include an interface and a processing system. The interface may be configured to obtain, from a second UE, one or more control signals scheduling one or more sidelink data messages, output, to the second UE over a set of multiple resource blocks of a sidelink feedback channel resource, a feedback message associated with the one or more sidelink data messages, the feedback message indicating a set of multiple feedback bits associated with the one or more sidelink data messages, and communicate with the second UE in accordance with the set of multiple feedback bits associated with the one or more sidelink data messages.

Another innovative aspect of the subject matter described in this disclosure can be implemented in an apparatus for wireless communications at a first UE. The apparatus may include a processor, memory coupled with the processor, and instructions stored in the memory. The instructions may be executable by the processor to cause the apparatus to receive, from a second UE, one or more control signals scheduling one or more sidelink data messages, transmit, to the second UE over a set of multiple resource blocks of a sidelink feedback channel resource, a feedback message associated with the one or more sidelink data messages, the feedback message indicating a set of multiple feedback bits associated with the one or more sidelink data messages, and communicate with the second UE in accordance with the set of multiple feedback bits associated with the one or more sidelink data messages.

Another innovative aspect of the subject matter described in this disclosure can be implemented in another apparatus for wireless communications at a first UE. The apparatus may include means for receiving, from a second UE, one or more control signals scheduling one or more sidelink data messages, means for transmitting, to the second UE over a set of multiple resource blocks of a sidelink feedback channel resource, a feedback message associated with the one or more sidelink data messages, the feedback message indicating a set of multiple feedback bits associated with the one or more sidelink data messages, and means for communicating with the second UE in accordance with the set of multiple feedback bits associated with the one or more sidelink data messages.

Another innovative aspect of the subject matter described in this disclosure can be implemented in a non-transitory computer-readable medium storing code for wireless communications at a first UE. The code may include instructions executable by a processor to receive, from a second UE, one or more control signals scheduling one or more sidelink data messages, transmit, to the second UE over a set of multiple resource blocks of a sidelink feedback channel resource, a feedback message associated with the one or more sidelink data messages, the feedback message indicating a set of multiple feedback bits associated with the one or more sidelink data messages, and communicate with the second UE in accordance with the set of multiple feedback bits associated with the one or more sidelink data messages.

Some implementations of the method, apparatuses, and non-transitory computer-readable medium described herein may further include operations, features, means, or instructions for applying a different cyclic shift to each sequence of a set of multiple sequences to indicate a positive acknowledgement (ACK) or a negative ACK (NACK) for that sequence, where each sequence of the set of multiple sequences corresponds to one of the set of multiple resource blocks of the sidelink feedback channel resource, and where transmitting the feedback message includes transmitting the cyclically shifted set of multiple sequences over the set of multiple resource blocks.

Some implementations of the method, apparatuses, and non-transitory computer-readable medium described herein may further include operations, features, means, or instructions for applying a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where transmitting the feedback message includes transmitting the cyclically shifted single sequence over the set of multiple resource blocks.

Some implementations of the method, apparatuses, and non-transitory computer-readable medium described herein may further include operations, features, means, or instructions for applying a coding scheme to the set of multiple feedback bits in accordance with a quantity of the set of multiple feedback bits and multiplexing the set of multiple feedback bits with a demodulation reference signal (DMRS) in a symbol of the sidelink feedback channel resource, where transmitting the feedback message includes transmitting a coded set of multiple feedback bits multiplexed with the DMRS.

One innovative aspect of the subject matter described in this disclosure can be implemented in a method for wireless communications at a second UE. The method may include transmitting, to a first UE from a second UE, one or more sidelink data messages, receiving, from the first UE over a set of multiple resource blocks of a sidelink feedback channel resource, a feedback message associated with the one or more sidelink data messages, the feedback message indicating a set of multiple feedback bits associated with the one or more sidelink data messages, and communicating with the first UE in accordance with the set of multiple feedback bits associated with the one or more sidelink data messages.

Another innovative aspect of the subject matter described in this disclosure can be implemented in an apparatus for wireless communications at a second UE. The apparatus may include an interface and a processing system. The interface may be configured to output, to a first UE from a second UE, one or more sidelink data messages, obtain, from the first UE over a set of multiple resource blocks of a sidelink feedback channel resource, a feedback message associated with the one or more sidelink data messages, the feedback message indicating a set of multiple feedback bits associated with the one or more sidelink data messages, and communicate with the first UE in accordance with the set of multiple feedback bits associated with the one or more sidelink data messages.

Another innovative aspect of the subject matter described in this disclosure can be implemented in an apparatus for wireless communications at a second UE. The apparatus may include a processor, memory coupled with the processor, and instructions stored in the memory. The instructions may be executable by the processor to cause the apparatus to transmit, to a first UE from a second UE, one or more sidelink data messages, receive, from the first UE over a set of multiple resource blocks of a sidelink feedback channel resource, a feedback message associated with the one or more sidelink data messages, the feedback message indicating a set of multiple feedback bits associated with the one or more sidelink data messages, and communicate with the first UE in accordance with the set of multiple feedback bits associated with the one or more sidelink data messages.

Another innovative aspect of the subject matter described in this disclosure can be implemented in another apparatus for wireless communications at a first UE. The apparatus may include means for transmitting, to a first UE from a second UE, one or more sidelink data messages, means for receiving, from the first UE over a set of multiple resource blocks of a sidelink feedback channel resource, a feedback message associated with the one or more sidelink data messages, the feedback message indicating a set of multiple feedback bits associated with the one or more sidelink data messages, and means for communicating with the first UE in accordance with the set of multiple feedback bits associated with the one or more sidelink data messages.

Another innovative aspect of the subject matter described in this disclosure can be implemented in a non-transitory computer-readable medium storing code for wireless communications at a first UE. The code may include instructions executable by a processor to transmit, to a first UE from a second UE, one or more sidelink data messages, receive, from the first UE over a set of multiple resource blocks of a sidelink feedback channel resource, a feedback message associated with the one or more sidelink data messages, the feedback message indicating a set of multiple feedback bits associated with the one or more sidelink data messages, and communicate with the first UE in accordance with the set of multiple feedback bits associated with the one or more sidelink data messages.

Some implementations of the method, apparatuses, and non-transitory computer-readable medium described herein may further include operations, features, means, or instructions for decoding the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where receiving the feedback message may be associated with decoding the cyclically shifted set of multiple sequences over the set of multiple resource blocks.

Some implementations of the method, apparatuses, and non-transitory computer-readable medium described herein may further include operations, features, means, or instructions for decoding the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where receiving the feedback message may be associated with decoding the cyclically shifted single sequence over the set of multiple resource blocks.

Some implementations of the method, apparatuses, and non-transitory computer-readable medium described herein may further include operations, features, means, or instructions for demultiplexing the set of multiple feedback bits from a DMRS in a symbol of the sidelink feedback channel resource and decoding the feedback message using a coding scheme, applied to the set of multiple feedback bits, in accordance with a quantity of the set of multiple feedback bits, where receiving the feedback message may be associated with decoding the feedback message using the coding scheme.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
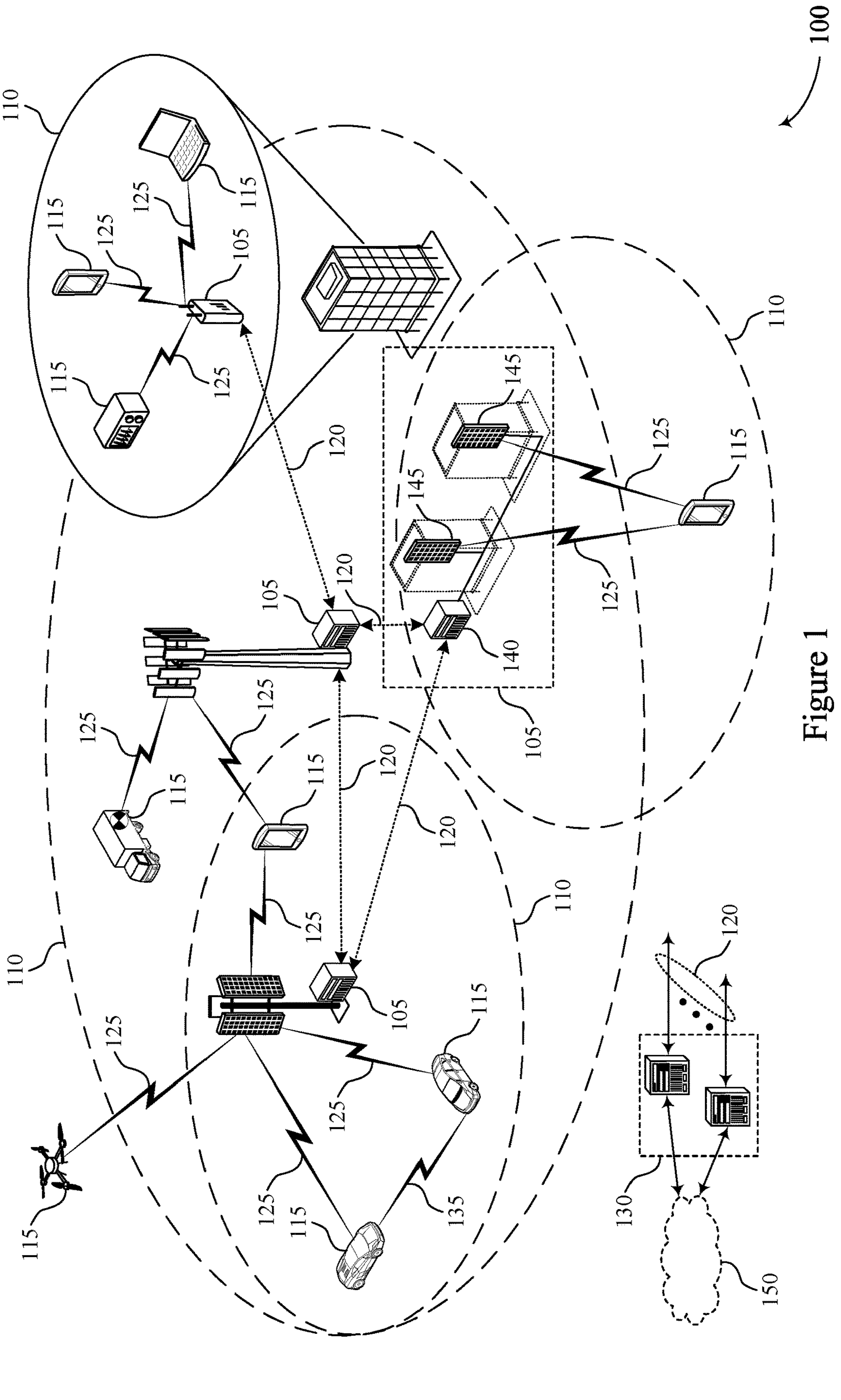
FIG. 1 shows an example wireless communications system that supports multi-bit feedback via a sidelink feedback channel.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G) or fifth generation (5G), or further implementations thereof, technology.

In some wireless communications systems, two or more user equipment (UEs) may communicate with each other via a sidelink. For example, a transmitting UE may transmit a sidelink data message to a receiving UE. The receiving UE may monitor for the sidelink data message and, in some aspects, may transmit feedback associated with the sidelink data message to the transmitting UE to indicate whether the receiving UE was able to successfully receive the sidelink data message. The receiving UE may transmit the feedback to the transmitting UE over a physical sidelink feedback channel (PSFCH) and the feedback may indicate either an acknowledgement (ACK), which indicates successful reception of the sidelink data message, or a negative ACK (NACK), which indicates unsuccessful reception of the sidelink data message. To convey the feedback, the receiving UE may use a length-12 sequence in one resource block and apply a specific cyclic shift to indicate ACK or NACK. Such a cyclically shifted length-12 sequence in one resource block may be insufficient to convey multi-bit sidelink feedback. For example, to convey multiple feedback bits (such as multiple ACKs or NACKs, or a combination of ACKs and NACKs), the receiving UE may use additional cyclic shifts, which may take away cyclic shifts that other UEs may use to multiplex sidelink feedback in the same PSFCH, thus reducing a multiplexing capability of the system.

In some implementations of the present disclosure, a first UE (which may be an example of a UE that provides feedback associated with one or more sidelink data messages) and a second UE (which may be an example of a UE that receives feedback associated with one or more sidelink data messages) may support a PSFCH design capable of conveying multi-bit feedback across multiple resource blocks. For example, the first UE may monitor for one or more sidelink data messages from the second UE and may transmit, to the second UE over multiple resource blocks of a PSFCH, a feedback message indicating multiple feedback bits associated with the sidelink data messages. The first UE may indicate or otherwise convey the multiple feedback bits via various sequence types. In some implementations, the first UE may support multiple length-12 sequence repetitions on multiple resource blocks. In such implementations, each of the multiple length-12 sequence repetitions may be associated with a same base sequence and the first UE may indicate an ACK or NACK via a specific cyclic shift of each of the multiple length-12 sequences. In some other implementations, the first UE may support one length-N sequence spanning multiple resource blocks. The length-N sequence may be associated with N orthogonal base sequences and the first UE may support a quantity of cyclic shifts for each base sequence. In such implementations, the first UE may indicate a specific bit stream (such as a series of two or more bit values) that maps to a sequence of ACKs or NACKs, or a combination of ACKs and NACKs, via a combination of a specific base sequence and a specific cyclic shift. Additionally, or alternatively, the first UE may support one or more coding schemes and PSFCH resource selection procedures associated with conveying multi-bit feedback through sidelink.

Particular implementations of the subject matter described in this disclosure can be implemented to realize one or more of the following potential advantages. For example, a UE may attempt to provide multi-bit feedback in various deployment scenarios and, in accordance with the implementations described herein, may achieve greater performance in any of such various deployment scenarios. In some scenarios, for example, a system may support an extension of various protocol types (such as an enhanced mobile broadband (eMBB) protocol type) or carrier aggregation to sidelink, and a UE (a destination node) may likely receive a continuous stream of sidelink data transmissions (such that UE may receive multiple sidelink data transmissions between PSFCH opportunities) or may otherwise attempt to convey more feedback information (such as an ACK/NACK bit for each of multiple carriers) in a given PSFCH opportunity. Additionally, or alternatively, in some scenarios, a UE may support sidelink communication over an unlicensed band. In such scenarios, the UE may be scheduled with relatively few or sparse PSFCH opportunities (such as sparser than a spacing of four slots between PSFCH opportunities), which also may result in the UE receiving multiple sidelink data transmissions between PSFCH opportunities. In any of such scenarios, instead of multiplexing (such as frequency division multiplexing) multiple PSFCH resources to convey multiple feedback bits, a UE may convey multi-bit feedback on a single PSFCH resource, which may reduce a quantity of PSFCH resources multiplexed at a same time (by a same UE). As such, a UE may provide more complete feedback or may provide feedback with lower latency (as the UE may wait less time for enough PSFCH resources over which to convey multiple feedback bits) without hindering a multiplexing capability of the system. Further, and as a result of more complete or lower latency feedback and maintained or greater multiplexing capability, the UE and the system may experience greater reliability and lower signaling overhead and the UE may experience reduced power consumption. As such, the UE and the system may experience higher data rates, greater spectral efficiency, and greater system capacity, among other benefits.

FIG. 1 shows an example wireless communications system 100 that supports multi-bit feedback via a sidelink feedback channel. The wireless communications system 100 may include one or more network entities (such as one or more components of one or more base stations (BSs) 105), one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the BSs 105 or the UEs 115 may be expressed in multiples of a basic time unit which may, such as refer to a sampling period of $T_s-1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, such as using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (such as over a carrier) and may be associated with an identifier for distinguishing neighboring cells (such as a physical cell identifier (PCID), a virtual cell identifier (VCID), or others). In some implementations, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (such as several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A BS 105 may support one or multiple cells and also may support communications over the one or more cells using one or multiple component carriers. In some implementations, a carrier may support multiple cells, and different cells may be configured according to different protocol types (such as MTC, narrowband IoT (NB-IoT), eMBB) that may provide access for different types of devices. In some implementations, two or more UEs 115 may support an extension of a protocol type (such as an eMBB protocol type) or a carrier aggregation technique, or both, to sidelink communication between the two or more UEs 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, such as a heterogeneous network in which different types of the BSs 105 provide coverage for various geographic coverage areas 110 using the same or different radio access technologies.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (such as LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, such as be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some systems, such as the wireless communications system 100, two or more UEs 115 may communicate via one or more sidelinks. Sidelink communication may involve transmissions over a physical sidelink shared channel (PSSCH) or a physical sidelink control channel (PSCCH), or both. For PSSCH or PSCCH transmissions, a transmitting UE 115 may request feedback (such as an ACK or a NACK) to be transmitted in a PSFCH. As such, a receiving UE 115 may monitor for PSSCH or PSCCH transmissions and provide feedback to the transmitting UE 115 over the PSFCH in accordance with the request. The receiving UE 115 may select a PSFCH resource from a resource pool, which may not be a dedicated resource pool. For example, the resource pool may be shared with one or more other UEs 115.

The receiving UE 115 may select the PSFCH resource in accordance with a set of parameters associated with sidelink feedback. For example, a periodPSFCHresource parameter may indicate or define a period in slots for a PSFCH transmission in a resource pool. The supported periods may be 0, 1, 2, or 4 (where 0 means that there is no PSFCH available), among other examples. Further, a PSFCH transmission timing may be during a first slot including a PSFCH resource after a received PSSCH and after a time period after the received PSSCH. The time period may be defined or indicated by a MinTimeGapPSFCH parameter. Further, an sl-PSFCH-RB-Set parameter may define an $$M_{PRB,set}^{PSFCH}$$

variable, which may indicate a quantity of a set of physical resource blocks (PRBs) in a resource pool for PSFCH in a slot. In some aspects, this quantity may be split between $$N_{PSSCH}^{PSFCH}$$

(a quantity of PSSCH slots corresponding to a PSFCH slot) and $N_{subch}$ (a quantity of sub-channels for a resource pool). In other words, each subchannel and slot includes $$M_{subch,slot}^{PSFCH}$$

PRBs, wherein $$M_{subch,slot}^{PSFCH}$$

may be defined in accordance with Equation 1. Further, there may be a time first mapping from PSSCH resources to PSFCH PRBs and a PSFCH resource pool size $$R_{PRB,CS}^{PSFCH}$$

may be defined in accordance with Equation 2.

$$M_{subch,slot}^{PSFCH} = \frac{M_{PRB,set}^{PSFCH}}{N_{PSSCH}^{PSFCH} \times N_{subch}} \quad (1)$$

$$R_{PRB,CS}^{PSFCH} = N_{type}^{PSFCH} \times N_{CS}^{PSFCH} \times M_{subch,slot}^{PSFCH} \quad (2)$$

As shown in Equation 2, $$N_{CS}^{PSFCH}$$

may be a quantity of cyclic shift pairs, configured per resource pool (where a pair is for indicating either ACK or NACK, such that one pair is capable of conveying 1 bit of information).

$$N_{type}^{PSFCH}$$

may be set to 1 or equal to a quantity of subchannels for a corresponding PSSCH $$N_{subch}^{PSSCH}.$$

In other words, a value of $$N_{type}^{PSFCH}$$

may indicate whether, for the subchannels in a PSSCH slot, a PSFCH resource pool is shared or not. Within a PSFCH resource pool, a PSFCH resource may be indexed by PRB index first and by cyclic shift pair index second.

Using such parameters, the receiving UE 115 may select or otherwise determine a PSFCH resource in accordance with a value of $$(P_{ID} + M_{ID}) \bmod R_{PRB,CS}^{PSFCH},$$

where $P_{ID}$ may be a physical source ID from sidelink control information (SCI), such as second stage SCI (SCI-2), including SCI 2-A or SCI 2-B, for PSSCH and $M_{ID}$ may be set to 0 or an identity of the receiving UE 115 (such as the UE receiving the PSSCH). As such, for unicast- or NACK-based transmission, $M_{ID}$=0 and the receiving UE 115 may send an ACK or a NACK or exclusively a NACK at a source ID-dependent resource in the PSFCH resource pool. For groupcast, the receiving UE 115 may select one PSFCH resource from the PSFCH resource pool and transmit an ACK or a NACK over the selected PSFCH resource.

In some scenarios, UEs 115 may support a sequence-based PSFCH format with one symbol (excluding an automatic gain control (AGC) training period). For example, UEs 115 may support a sequence-based PSFCH format for unicast and groupcast signaling, including for groupcast options 1 and 2 (where groupcast option 1 may refer to exclusively NACK transmissions for sidelink groupcast feedback and groupcast option 2 may refer to ACK or NACK transmissions for sidelink groupcast feedback). For sequence-based PSFCH formats with one symbol (excluding the AGC training period), a UE 115 may use 1 PRB and may indicate 1 bit. To indicate 1 bit of feedback information (such as HARQ-ACK) in PSFCH, UEs 115 may differentiate between ACK and NACK by using different cyclic shifts of a same base sequence in a same PRB (where a cyclic shift corresponding to an ACK may not be defined or used for groupcast option 1).

For such a sequence-based PSFCH, a UE 115 may transmit the 1 bit of HARQ-ACK information via a length-12 sequence with different cyclic shifts. For multi-bit HARQ-ACK information on a PSFCH, a length-12 sequence in one PRB may be insufficient. For example, to convey multiple feedback bits (such as multiple ACKs or NACKs, or a combination of ACKs and NACKs) in one PRB, a UE 115 may use additional cyclic shifts, which may take away cyclic shifts that other UEs 115 may have otherwise used to multiplex sidelink feedback in the same PRB, thus reducing a multiplexing capability of the system. In other words, the more bits of HARQ-ACK information conveyed by one user over a PSFCH resource, the fewer users can be multiplexed in the same PSFCH resource.

In some implementations, communicating UEs 115 may support a PSFCH design capable of conveying multi-bit feedback across multiple resource blocks without or minimally impacting a multiplexing capability of the system. For example, a first UE 115 (such as a receiving UE 115) may monitor for one or more sidelink data messages from a second UE 115 (such as a transmitting UE 115) and may transmit, to the second UE 115 over multiple resource blocks of a PSFCH, a feedback message indicating multiple feedback bits associated with the sidelink data messages. The first UE 115 may indicate or otherwise convey the multiple feedback bits via various sequence types. In some implementations, such as the first UE 115 may support multiple length-12 sequence repetitions on multiple resource blocks. In such implementations, each of the multiple length-12 sequence repetitions may be associated with a same base sequence and the first UE 115 may indicate an ACK or NACK via a specific cyclic shift of each of the multiple length-12 sequences.

In some other implementations, the first UE 115 may support one length-N sequence spanning multiple resource blocks. The length-N sequence may be associated with N orthogonal base sequences and the first UE 115 may support a quantity of cyclic shifts for each base sequence. In such implementations, the first UE 115 may indicate a specific bit stream (such as a series of two or more bit values) that maps to a sequence of ACKs or NACKs, or both, via a combination of a specific base sequence and a specific cyclic shift. Additionally, or alternatively, the first UE 115 may support one or more coding schemes and PSFCH resource selection procedures associated with conveying multi-bit feedback.

Figure 2:
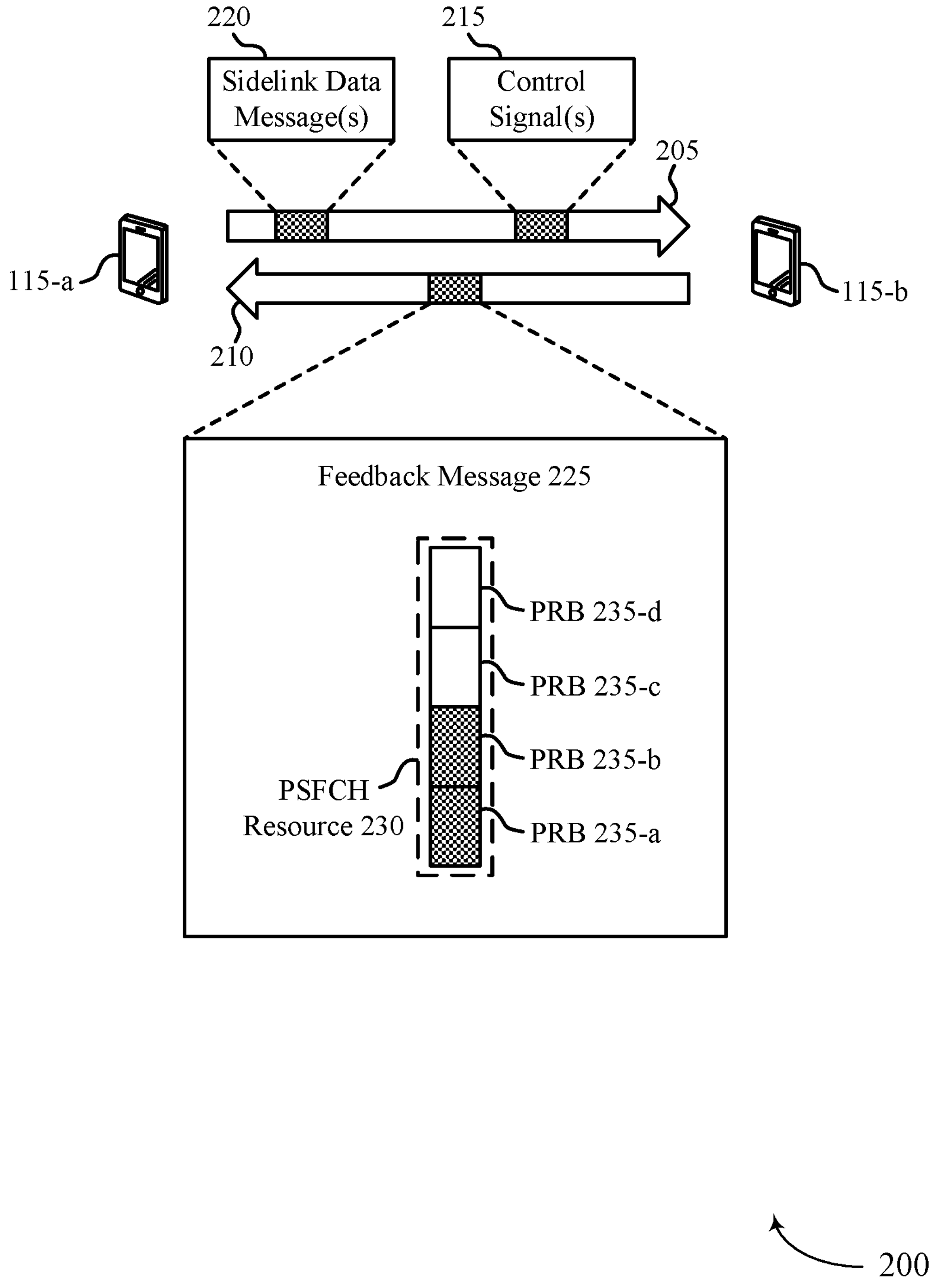
FIG. 2 shows an example signaling diagram that supports multi-bit feedback via a sidelink feedback channel.

FIG. 2 shows an example signaling diagram 200 that supports multi-bit feedback via a sidelink feedback channel. The signaling diagram 200 may implement or be implemented to realize aspects of the wireless communications system 100. For example, the signaling diagram 200 may illustrate communication between a UE 115-*a* and a UE 115-*b*, which each may be an example of a UE 115 as illustrated by and described with reference to FIG. 1. In some implementations, the UE 115-*a* and the UE 115-*b* may support a PSFCH design capable of conveying multi-bit feedback across multiple resource blocks.

The UE 115-*a* may transmit to the UE 115-*b* via a sidelink 205 (which may be an example of a forward link) and the UE 115-*b* may transmit to the UE 115-*a* via a sidelink 210 (which may be an example of a reverse link). The UE 115-*a* may transmit one or more control signals 215 to the UE 115-*b* scheduling one or more sidelink data messages 220. For example, the one or more control signals 215 may indicate a time and frequency resource allocation, such as a PSSCH resource allocation, for the one or more sidelink data messages 220. The one or more control signals 215 may be an example of an SCI transmission (such as one or both of a first stage SCI (SCI-1) transmission and an SCI-2 transmission) or may be an example of a PC5-RRC transmission, or both. The one or more sidelink data messages 220 may be examples of one or more PSSCH transmissions. In accordance with receiving the one or more control signals 215, the UE 115-*b* may monitor the indicated time and frequency resource allocation for the one or more sidelink data messages 220.

The UE 115-*a* may, in some aspects, request feedback associated with the one or more sidelink data messages 220. The UE 115-*a* may request the feedback associated with the one or more sidelink data messages 220 via the one or more control signals 215 or via other signaling. As such, the UE 115-*b* may attempt to receive the one or more sidelink data messages 220 in accordance with the one or more control signals 215 and may provide feedback to the UE 115-*a* in accordance with whether the UE 115-*b* successfully receives the one or more sidelink data messages 220 or fails to receive the one or more sidelink data messages 220. The feedback may indicate multiple feedback bits (such as multiple HARQ-ACK information bits) associated with the one or more sidelink data messages 220 and the UE 115-*b* may transmit the feedback via a feedback message 225 on a PSFCH resource 230.

In some implementations, the UE 115-*b* may transmit the feedback message 225 over multiple PRBs 235 on the PSFCH resource 230 to convey the multiple feedback bits. For example, the PSFCH resource 230 may include a PRB 235-*a*, a PRB 235-*b*, a PRB 235-*c*, and a PRB 235-*d* (which may collectively or generally be referred to as PRBs 235) and, as shown in the example of the signaling diagram 200, the UE 115-*b* may transmit the feedback message 225 over the PRB 235-*a* and the PRB 235-*b*. Generally, the UE 115-*b* may use X PRBs 235 for the feedback message 225, where X may be configured (such as via RRC signaling) per resource pool or may be preconfigured (such as hardcoded or defined in a specification) at the UE 115-*b*. X may be 2, 4, or other values.

The UE 115-*b* may transmit the feedback message 225 via a sequence-based format and may generate or select one or more sequences for the feedback message 225 in various manners. In some implementations, the UE 115-*b* may use multiple length-12 sequence repetitions on the PRB 235-*a* and the PRB 235-*b*. In such implementations, the UE 115-*b* may use a same base sequence on each of the PRB 235-*a* and the PRB 235-*b* and may use specific cyclic shifts on each of the PRB 235-*a* and the PRB 235-*b* to convey multiple feedback bits. In other words, such as ACK and NACK in a given HARQ-ACK codeblock location may be differentiated by different cyclic shifts of the same base sequence in a given PRB 235.

In some implementations, the UE 115-*b* may use a different cyclic shift pair to differentiate between ACK and NACK on each PRB 235. For example, the UE 115-*b* may use a first cyclic shift pair to differentiate between an ACK and a NACK on the PRB 235-*a* and may use a second cyclic shift pair to differentiate between an ACK and a NACK on the PRB 235-*b*. As such, a first cyclic shift of a cyclic shift pair may indicate an ACK and a second cyclic shift of the cyclic shift pair may indicate a NACK. In an example, the UE 115-*b* may select or otherwise determine an initial cyclic shift $m_0$ for a first PRB 235 (such as the PRB 235-*a*) of the PSFCH resource 230 in accordance with a cyclic shift pair index (which may correspond to a PSFCH resource index in view of a configured or signaled mapping) and a quantity $$N_{cs}^{PSFCH}$$

of available cyclic shifts for the PSFCH resource 230 in accordance with Table 1. As shown in the example of Table 1, the UE 115-*b* may use a cycle of cyclic shifts for different PRBs 235. Additional details relating to such a cycling of cyclic shifts across different PRBs 235, which may reduce a peak-to-average-power ratio (PAPR), are illustrated by and described with reference to FIGS. 3 and 4.

TABLE 1

| | $m_0$ for a First PRB 235 of a PSFCH Resource 230 | | | | | |
|---|---|---|---|---|---|---|
| $N_{cs}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

As shown in Table 1, an initial cyclic shift $m_0$ of a sequence in a first PRB 235 may be associated with or determined in accordance with a cyclic shift pair index and a quantity of cyclic shift pairs (which may be denoted by $$N_{cs}^{PSFCH}).$$

For example, if the UE 115-*b* uses or is configured to use 2 cyclic shift pairs, an initial cyclic shift $m_0$ on a PRB 235 may be 0 if the PRB 235 is associated with a cyclic shift pair index 0 or may be 3 if the PRB 235 is associated with a cyclic shift pair index 1. If the UE 115-*b* uses or is configured to use 3 cyclic shift pairs, an initial cyclic shift $m_0$ on a PRB 235 may be 0 if the PRB 235 is associated with a cyclic shift pair index 0, 2 if the PRB 235 is associated with a cyclic shift pair index 1, or 4 if the PRB 235 is associated with a cyclic shift pair index 2. As such, the UE 115-*b* may achieve a transmission diversity by using a spacing, such as a maximum spacing, between initial cyclic shifts of different cyclic shift pair indices, which may reduce a PAPR of the UE 115-*b*. Such a correspondence or mapping as shown by Table 1 may be signaled to one or both of the UE 115-*a* and the UE 115-*b* from the other of the UE 115-*a* or the UE 115-*b* or from a network entity (such as one or more components of a BS 105 as illustrated by and described with reference to FIG. 1) or may be preconfigured at one or both of the UE 115-*a* and the UE 115-*b*.

In some other implementations, the UE 115-*a* and the UE 115-*b* may support a relatively longer sequence spanning multiple PRBs 235 of the PSFCH resource 230 to convey multiple feedback bits via the feedback message 225. For example, the UE 115-*b* may use a length-N sequence spanning multiple PRBs 235, such as spanning the PRB 235-*a* and the PRB 235-*b*. A length of the sequence N may be calculated in accordance with a product of a quantity of PRBs 235 over which the UE 115-*b* transmits the feedback message 225 (which may be denoted by X) and a quantity of subcarriers per PRB 235 (which may be denoted by $$N_{sc}^{RB}).$$

In other words, $$N = X * N_{sc}^{RB}.$$

In some aspects, $$N_{sc}^{RB} = 12$$

such that, in the example of the feedback message 225 spanning the PRB 235-*a* and the PRB 235-*b*, N=24. In such implementations in which the UE 115-*b* transmits the feedback message 225 using one length-N sequence spanning multiple PRBs 235, the UE 115-*b* may indicate a specific bit stream (such as a series of bit values) via the feedback message 225 in accordance with using a specific base sequence and cyclic shift combination for the length-N sequence in the X PRBs 235. Different bit steams may correspond to different HARQ-ACK information bits, as illustrated by and described in more detail with reference to FIG. 5.

Additionally, or alternatively, the UE 115-*a* and the UE 115-*b* may apply one or more coding schemes to support a relatively larger payload (such as to support multiple feedback bits) and to support using more than one PRB 235 (such as the PRB 235-*a* and the PRB 235-*b*) in the PSFCH resource 230. In some implementations, the UE 115-*b* may apply the one or more coding schemes for the PSFCH resource 230 similarly to how a UE 115 may apply a coding scheme to a physical uplink control channel (PUCCH) format 2 (PF2). In other words, the UE 115-*b* may support a PF2-like PSFCH resource 230. Additional details relating to such coding schemes are illustrated by and described with reference to FIGS. 6-8.

In some implementations, the UE 115-*a* and the UE 115-*b* may support a PSFCH resource selection procedure that is related to one or more parameters associated with indicating multiple feedback bits via the feedback message 225 over multiple PRBs 235. For example, the UE 115-*b* may select the PSFCH resource 230 from a resource pool (such as a PSFCH resource pool) that is related to one or more of a quantity of PRBs 235 per PSFCH resource 230 (which may be denoted by X), a maximum or upper limit quantity of feedback bits (such as HARQ-ACK information bits) that can be carried per PSFCH resource 230 (which may be denoted by Y), and a quantity of cyclic shifts per resource pool (which may be denoted by $M_{CS}$).

The UE 115-*b* may select the PSFCH resource 230, or may select the resource pool including the PSFCH resource 230, in accordance with one or more parameters and formulas associated with a quantity of available PRBs 235 and a quantity of dimensions in which PSFCH resources 230 can be multiplexed. In some implementations, such as an rbSetPSFCH parameter may define a $M_{PRB,set}^{PSFCH}$ variable associated with a quantity of a set of PRBs 235 that are allocated for a PSFCH in a slot. The quantity of the set of PRBs 235 that are allocated for a PSFCH in a slot $(M_{PRB,set}^{PSFCH})$ may be split between a quantity of PSSCH slots corresponding to a PSFCH slot (which may be denoted by $N_{PSSCH}^{PSFCH})$ and a quantity of PSSCH resources in a slot (which may be equivalently referred to as a quantity of subchannels and denoted by $N_{subch}$). As such, a quantity of resource block groups (RBGs) for each subchannel and slot pair may be defined in accordance with Equation 3. In some aspects, the UE 115-*a* and the UE 115-*b* may support a time first mapping from a PSSCH resource to an RBG.

$$M_{subch,slot}^{PSFCH} = \frac{M_{PRB,set}^{PSFCH}}{X \times N_{PSSCH}^{PSFCH} \times N_{subch}} \tag{3}$$

Accordingly, a quantity of PSFCH resources 230 available for multiplexing HARQ-ACK information in a PSFCH (which may be denoted by $R_{PRB,CS}^{PSFCH})$ may be defined in accordance with Equation 4.

$$R_{PRB,CS}^{PSFCH} = N_{type}^{PSFCH} \times N_{PSFCH} \times M_{subch,slot}^{PSFCH} \tag{4}$$

Accordingly, the UE 115-*b* (and the UE 115-*a*) may select or otherwise determine an index of the PSFCH resource 230 for the feedback message 225 (a PSFCH transmission) in response to the one or more sidelink data messages 220 (a PSSCH reception) as $$(P_{ID} + M_{ID}) \bmod R_{PRB,CS}^{PSFCH}.$$

Additional details relating such a PSFCH resource selection are illustrated by and described in more detail with reference FIG. 9.

As shown in Equation 4, $N_{type}^{PSFCH}$ may be set to 1 or may be equal to a quantity of subchannels for a corresponding PSSCH (which may be denoted by $N_{subch}^{PSSCH})$ and may indicate whether a PSFCH resource pool is shared. As such, $N_{type}^{PSFCH}$ may be referred to herein as a first value associated with indicating whether the resource pool is shared. The UE 115-*b* may select a value for $N_{PSFCH}$, which may be referred to herein as a second value associated with a quantity of dimensions in which PSFCH resources can be multiplexed, in accordance with one of various options. The option according to which the UE 115-*b* selects a value for $N_{PSFCH}$ may vary in accordance with whether the UE 115-*b* uses multiple length-12 sequence repetitions, one relatively longer sequence, or a coding scheme to convey multiple feedback bits via the feedback message 225. Additional details relating to a value for $N_{PSFCH}$, and specifically relating to the quantity of dimensions in which PSFCH resources can be multiplexed for each of a use of multiple length-12 sequence repetitions, one relatively longer sequence, or a coding scheme to convey multiple feedback bits, are illustrated by and described with reference to FIG. 10.

$M_{subch,slot}^{PSFCH}$ may be referred to herein as a third value associated with a quantity of RBGs for each subchannel and slot pair.

As such, the UE 115-*b* may generate or otherwise use a sequence-based feedback message 225 to convey multiple feedback bits over multiple PRBs 235 of a PSFCH resource 230. In accordance with such multi-bit feedback, the UE 115-*a* may identify or ascertain whether each of the one or more sidelink data messages 220 were successfully or unsuccessfully received by the UE 115-*b* and the UE 115-*a* and the UE 115-*b* may communicate with each other accordingly. In implementations in which the feedback message 225 conveys one or more NACKs, such as the UE 115-*a* may retransmit one or more sidelink data messages 220 corresponding to the one or more NACKs. Additionally, or alternatively, in implementations in which the feedback message 225 conveys one or more ACKs, the UE 115-*a* may refrain from retransmitting one or more sidelink data messages 220 corresponding to the one or more ACKs (and instead transmit new data).

In some implementations, the UE 115-*a* and the UE 115-*b* may receive or be preconfigured with a mapping or correspondence between ACK/NACK locations and sidelink data messages 220. For example, in accordance with a mapping, the UE 115-*b* may indicate an ACK or a NACK via the PRB 235-*a* (such as via a cyclic shift of a sequence on the PRB 235-*a*) corresponding to a first sidelink data message 220 and may indicate an ACK or a NACK via the PRB 235-*b* (such as via a cyclic shift of a sequence on the PRB 235-*b*) corresponding to a second sidelink data message 220. Additionally, or alternatively, the UE 115-*b* may indicate a bit stream via the feedback message 225 corresponding to a unique permutation of ACKs, NACKs, or a combination of ACKs and NACKs. In such implementations, in accordance with a mapping, a first bit in the bit stream may indicate an ACK or a NACK for a first sidelink data message 220 and a second bit in the bit stream may indicate an ACK or a NACK for a second sidelink data message 220.

Figure 3:
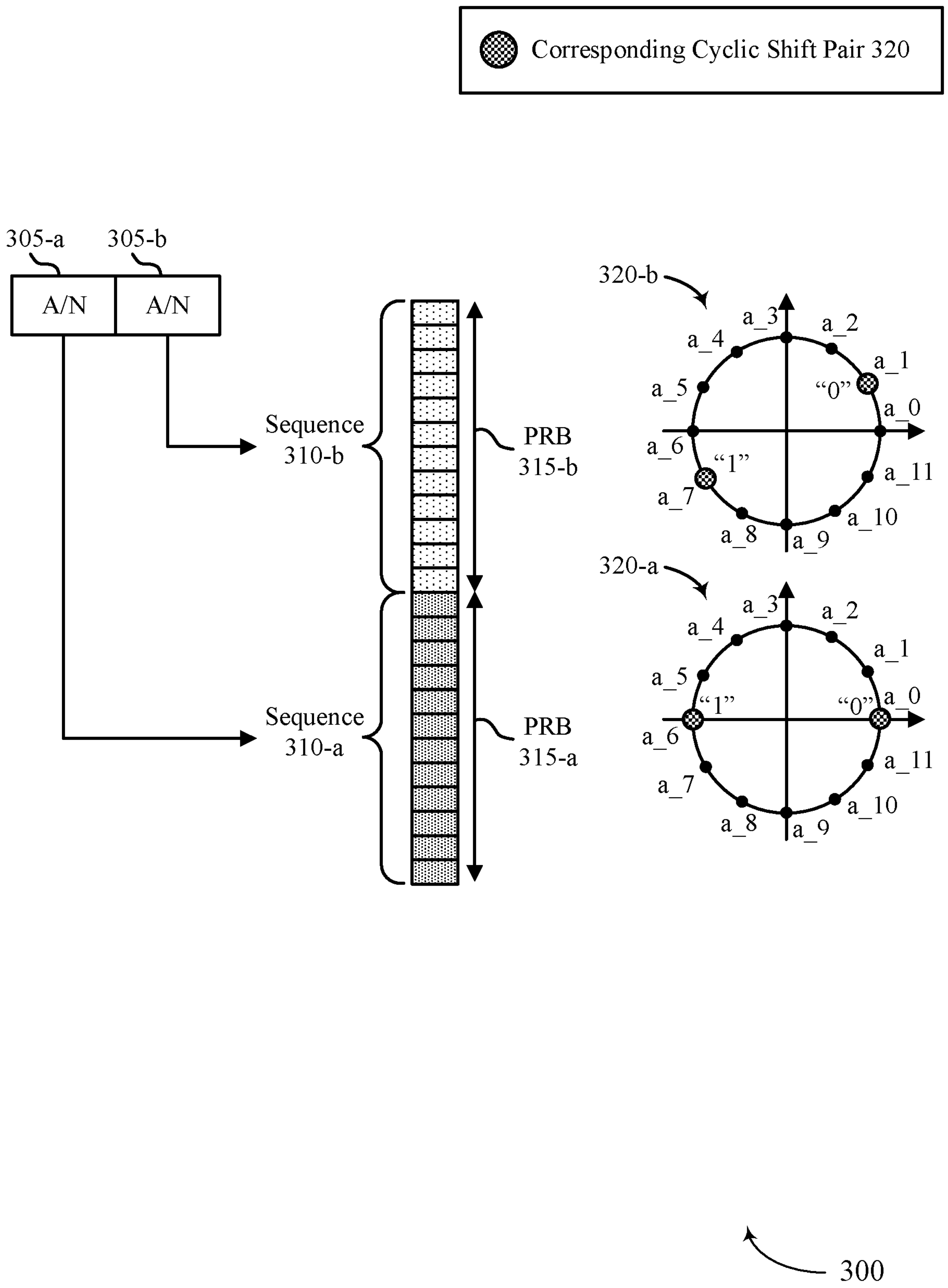
FIGS. 3-5 show example sequence mappings that support multi-bit feedback via a sidelink feedback channel.

FIG. 3 shows an example sequence mapping 300 that supports multi-bit feedback via a sidelink feedback channel. The sequence mapping 300 may implement or be implemented to realize aspects of the wireless communications system 100 or the signaling diagram 200. For example, a UE 115, which may be an example of a UE 115 as illustrated by and described with reference to FIG. 1 or a UE 115-*b* as illustrated by and described with reference to FIG. 2, may employ the sequence mapping 300 to convey multiple feedback bits 305 (such as a feedback bit 305-*a* and a feedback bit 305-*b*) via a feedback message 225. In some implementations, such as the UE 115 may employ the sequence mapping 300 to transmit multiple repetitions of a sequence 310 (such as a sequence 310-*a* and a sequence 310-*b*) across multiple PRBs 315 (such as a PRB 315-*a* and a PRB 315-*b*). The sequence 310-*a* and the sequence 310-*b* may be length-12 sequences and the sequence mapping 300 may illustrate an example in which the UE 115 indicates 2-bit HARQ-ACK codeblock information on 2 PRBs 315.

For example, to convey an ACK or a NACK (illustrated in FIG. 3 as "A/N") via a first feedback bit 305-*a* and an ACK or a NACK via a second feedback bit 305-*b*, the UE 115 may map a sequence 310-*a* to a PRB 315-*a* and a sequence 310-*b* to a PRB 315-*b*, where the sequence 310-*a* and the sequence 310-*b* may be associated with a same base sequence and different cyclic shifts. In other words, the UE 115 may use different cyclic shifts of a same base sequence to differentiate between ACK and NACK. In some implementations, the UE 115 may indicate an ACK or a NACK via the sequence 310-*a* in accordance with using a cyclic shift from a first cyclic shift pair 320-*a* and may indicate an ACK or a NACK via the sequence 310-*b* in accordance with using a cyclic shift from a second cyclic shift pair 320-*b*. For example, and as shown in the sequence mapping 300, the base sequence may be associated with 12 different cyclic shifts separated into 6 different cyclic shift pairs 320 (where a cyclic shift pair 320 may refer to the cyclic shift pair 320-*a* and the cyclic shift pair 320-*b* generally, along with other possible cyclic shift pairs available from 12 total cyclic shifts).

The cyclic shift pair 320-*a* may be associated with a first cyclic shift $a_0$ associated with indicating a NACK (which may be associated with a bit value "0") and a second cyclic shift $a_6$ associated with indicating an ACK (which may be associated with a bit value "1"). Similarly, the cyclic shift pair 320-*b* may be associated with a first cyclic shift $a_1$ associated with indicating a NACK (which may be associated with a bit value "0") and a second cyclic shift $a_7$ associated with indicating an ACK (which may be associated with a bit value "1"). As such, the UE 115 may select one of the first cyclic shift $a_0$ and the second cyclic shift $a_6$ to indicate either an ACK or a NACK via the feedback bit 305-*a* and may select one of the first cyclic shift $a_1$ and the second cyclic shift $a_7$ to indicate either an ACK or a NACK via the feedback bit 305-*b*.

Figure 4:
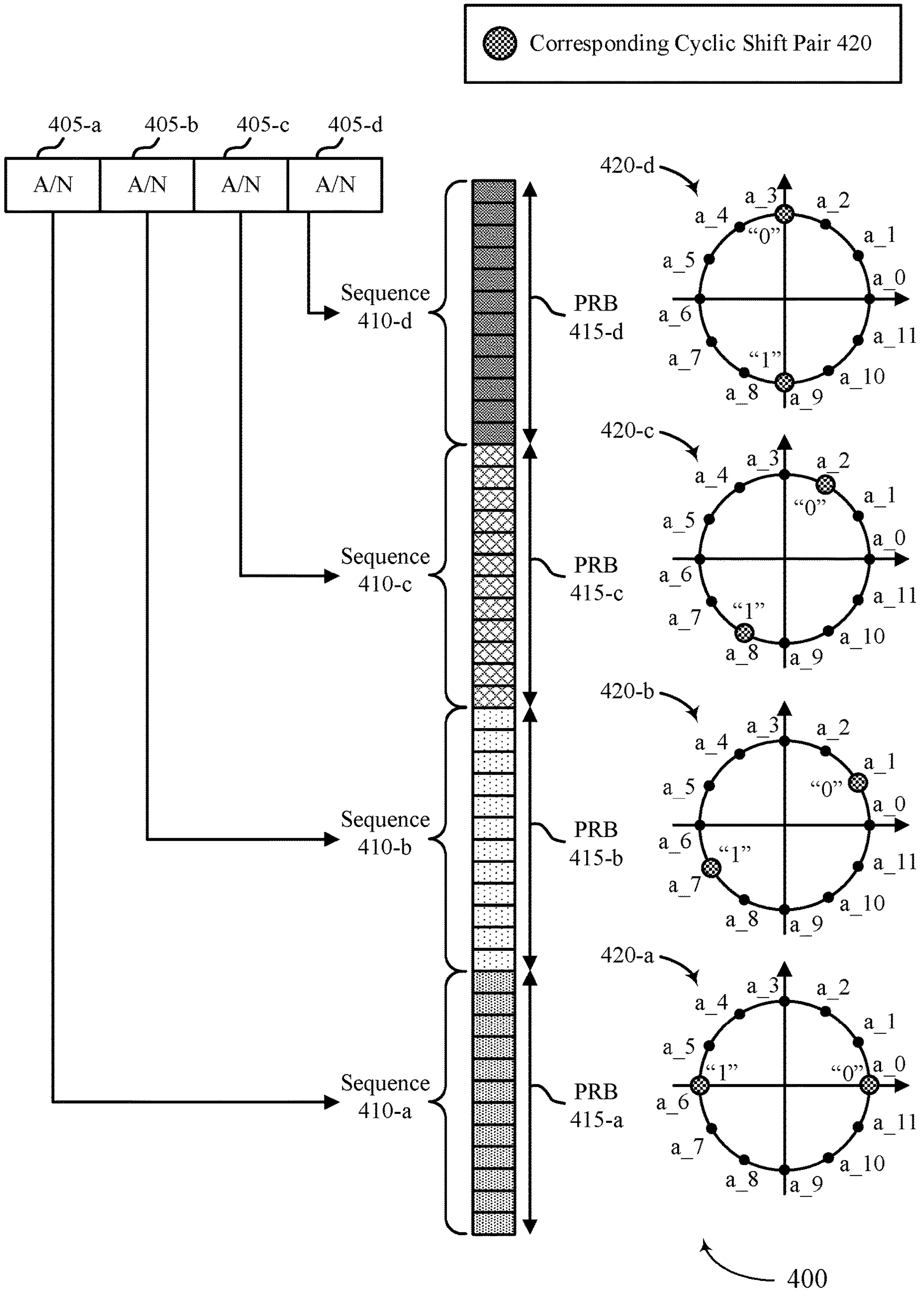

FIG. 4 shows an example sequence mapping 400 that supports multi-bit feedback via a sidelink feedback channel. The sequence mapping 400 may implement or be implemented to realize aspects of the wireless communications system 100 or the signaling diagram 200. For example, a UE 115, which may be an example of a UE 115 as illustrated by and described with reference to FIG. 1 or a UE 115-*b* as illustrated by and described with reference to FIG. 2, may employ the sequence mapping 400 to convey multiple feedback bits 405 (such as a feedback bit 405-*a*, a feedback bit 405-*b*, a feedback bit 405-*c*, and a feedback bit 405-*d*) via a feedback message 225. In some implementations, such as the UE 115 may employ the sequence mapping 400 to transmit multiple repetitions of a sequence 410 (such as a sequence 410-*a*, a sequence 410-*b*, a sequence 410-*c*, and a sequence 410-*d*) across multiple PRBs 315 (such as a PRB 415-*a*, a PRB 415-*b*, a PRB 415-*c*, and a PRB 415-*d*). The sequences 410 may be length-12 sequences and the sequence mapping 400 may illustrate an example in which the UE 115 indicates 4-bit HARQ-ACK codeblock information on 4 PRBs 415.

For example, to convey an ACK or a NACK (illustrated in FIG. 4 as "A/N") via each feedback bit 405, the UE 115 may map each sequence 410 to a PRB 415, where the sequences 410 may be associated with a same base sequence and different cyclic shifts. In other words, the UE 115 may use different cyclic shifts of a same base sequence to differentiate between ACK and NACK. In some implementations, the UE 115 may indicate an ACK or a NACK via each sequence 410 in accordance with using a cyclic shift from a different cyclic shift pair 420. For example, and as shown in the sequence mapping 400, the base sequence may be associated with 12 different cyclic shifts separated into 6 different cyclic shift pairs 420 (where a cyclic shift pair 420 may refer to a cyclic shift pair 420-*a*, a cyclic shift pair 420-*b*, a cyclic shift pair 420-*c*, and a cyclic shift pair 420-*d* generally, along with other possible cyclic shift pairs available from 12 total cyclic shifts).

The cyclic shift pair 420-*a* may be associated with a first cyclic shift $a_0$ associated with indicating a NACK (which may be associated with a bit value "0") and a second cyclic shift $a_6$ associated with indicating an ACK (which may be associated with a bit value "1"). Similarly, the cyclic shift pair 420-*b* may be associated with a first cyclic shift $a_1$ associated with indicating a NACK (which may be associated with a bit value "0") and a second cyclic shift $a_7$ associated with indicating an ACK (which may be associated with a bit value "1"). Further, the cyclic shift pair 420-*c* may be associated with a first cyclic shift $a_2$ associated with indicating a NACK (which may be associated with a bit value "0") and a second cyclic shift $a_8$ associated with indicating an ACK (which may be associated with a bit value "1") The cyclic shift pair 420-*d* may be associated with a first cyclic shift $a_3$ associated with indicating a NACK (which may be associated with a bit value "0") and a second cyclic shift $a_9$ associated with indicating an ACK (which may be associated with a bit value "1"). As such, the UE 115 may select one of the first cyclic shift $a_0$ and the second cyclic shift $a_6$ to indicate either an ACK or a NACK via the feedback bit 405-*a*, one of the first cyclic shift $a_1$ and the second cyclic shift $a_7$ to indicate either an ACK or a NACK via the feedback bit 405-*b*, one of the first cyclic shift $a_2$ and the second cyclic shift $a_8$ to indicate either an ACK or a NACK via the feedback bit 405-*c*, and one of the first cyclic shift $a_3$ and the second cyclic shift $a_9$ to indicate either an ACK or a NACK via the feedback bit 405-*d*.

Figure 5:
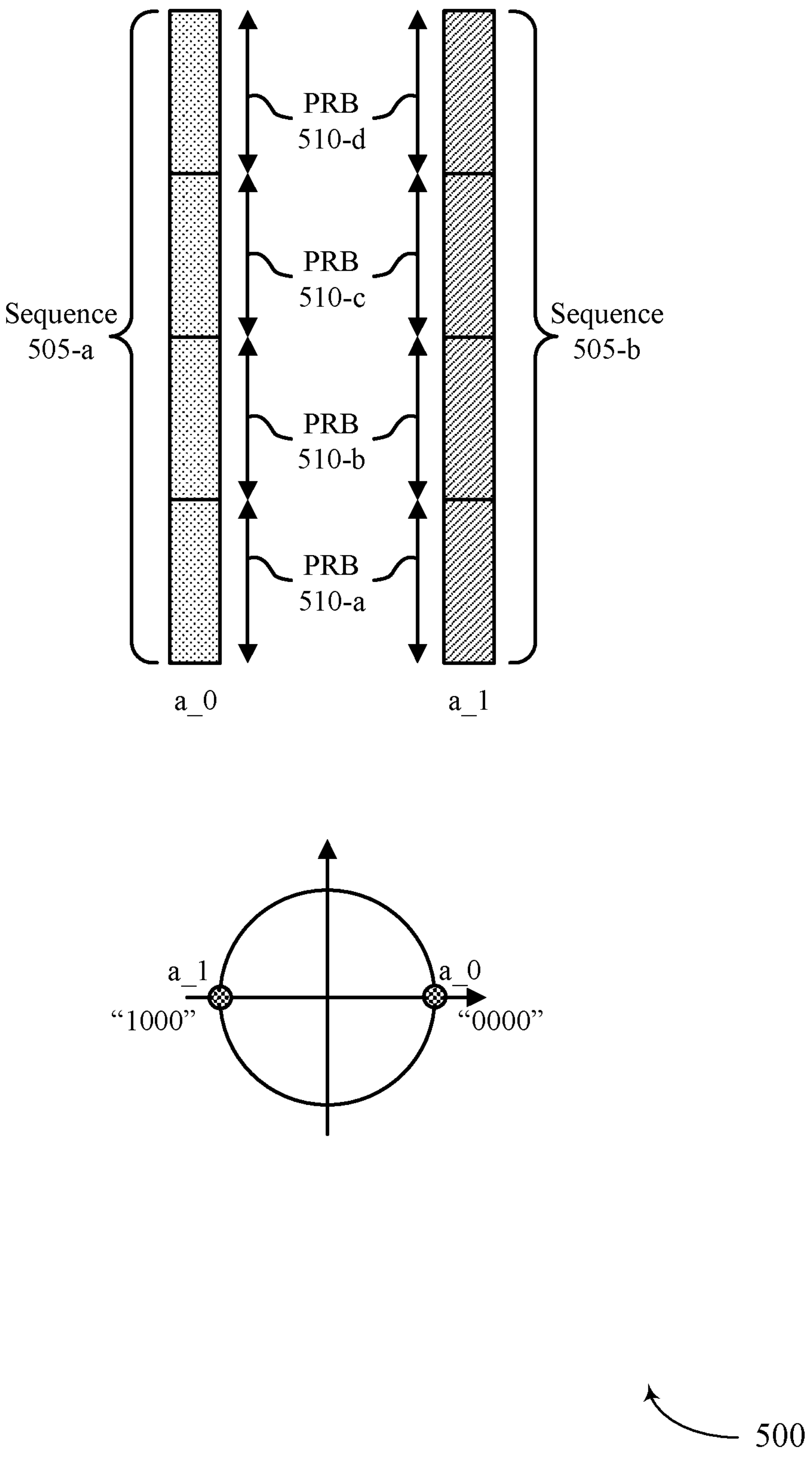

FIG. 5 shows an example sequence mapping 500 that supports multi-bit feedback via a sidelink feedback channel. The sequence mapping 500 may implement or be implemented to realize aspects of the wireless communications system 100 or the signaling diagram 200. For example, a UE 115, which may be an example of a UE 115 as illustrated by and described with reference to FIG. 1 or a UE 115-*b* as illustrated by and described with reference to FIG. 2, may employ the sequence mapping 500 to convey multiple feedback bits via a feedback message 225. In some implementations, such as the UE 115 may employ the sequence mapping 500 to transmit one sequence 505 (such as either a sequence 505-*a* or a sequence 505-*b*) across multiple PRBs 510 (such as a PRB 510-*a*, a PRB 510-*b*, a PRB 510-*c*, and a PRB 510-*d*). The sequence 505-*a* and the sequence 505-*b* may be examples of length-N sequences and the sequence mapping 500 may illustrate an example in which the UE 115 indicates multi-bit HARQ-ACK codeblock information on 4 PRBs 510 via a base sequence and cyclic shift combination associated with the sequence 505-*a* or the sequence 505-*b*.

For example, the UE 115 may support a relatively longer sequence 505 (which may refer to one or both of the sequence 505-*a* or the sequence 505-*b*) spanning multiple PRBs 510. In some implementations, a length of the sequence 505 may be defined in accordance with $$N = X * N_{sc}^{RB}.$$

For example, for 4 PRBs 510, the sequence 505 may be a length-48 sequence. For a length-N sequence 505, the UE 115 may generate N orthogonal base sequences and, for each base sequence, the UE 115 may use one of $M_{CS}$ cyclic shifts. The $M_{CS}$ cyclic shifts may be configured at the UE 115 (such as via configuration signaling) per resource pool or may be hardcoded at the UE 115. As such, the UE 115 may support a total quantity of sequences 505 equal to $$N * M_{CS} = X * N_{sc}^{RB} * M_{CS}.$$

The UE 115 may use a PSFCH resource, such as a PSFCH resource 230 as illustrated by and described with reference to FIG. 2, that is capable of carrying up to Y HARQ-ACK information bits. A value of Y may be configured at the UE 115 (such as via configuration signaling) per resource pool or may be hardcoded at the UE 115. To convey Y bits of HARQ-ACK information, the UE 115 may use a quantity of $2^Y$ sequences. In other words, a quantity of sequences capable of carrying Y bits of feedback information may be equal to $2^Y$. As such, the total quantity of $N*M_{CS}$ sequences 505 may be divided into G groups in accordance with $G=N*M_{CS}/2^Y$, where different groups may be used for different users (such as different UEs 115). For sequence grouping, $N*M_{CS}$ sequences 505 may be indexed by cyclic shift index first and by base sequence index second. Accordingly, a first group may include a first $2^Y/M_{CS}$ base sequences 505, where each sequence is associated with $M_{CS}$ cyclic shifts, a second group may include a second (or subsequent) $2^Y/M_{CS}$ base sequences 505, where each sequence is associated with $M_{CS}$ cyclic shifts, and so on.

In some implementations, for a given user (such as for the UE 115), multi-bit HARQ-ACK information may be differentiated by different sequences within a group. In other words, the UE 115 may indicate unique HARQ-ACK information in accordance with a unique combination of base sequence and cyclic shift across the multiple PRBs 510 (such as across the X PRBs 510). The UE 115 may select or otherwise determine a group index (such as an indication as to from which group the UE 115 may select a sequence 505) in accordance with a PSFCH resource index. The UE 115 may select or otherwise determine a PSFCH resource index in accordance with a Layer 1 (L1) source ID for unicast and for groupcast option 1 (NACK-based HARQ-ACK feedback) or in accordance with an L1 source ID and a member ID of the receiving UE 115 for groupcast option 2 (ACK/NACK-based HARQ-ACK feedback). In some implementations, a mapping between sequences 505 in a group and the $2^Y$ states of the multi-bit HARQ-ACK feedback (such as the $2^Y$ unique bit streams conveyable by the sequences 505) may be configured at the UE 115 (such as via configuration signaling) or may be hardcoded at the UE 115. An example mapping relationship between sequences 505 within a group and the $2^Y$ states of the multi-bit HARQ-ACK feedback is illustrated by Table 2.

In the example of Table 2 and the example sequence mapping 500, X=4, Y=1, 2, 3 or 4, N=48, and $M_{CS}$=2. X=4, N=48, and $M_{CS}$=2 are illustrated in the example sequence mapping 500 in accordance with a sequence 505 spanning four PRBs 510 (where X is defined by the quantity of PRBs 510), in accordance with $$N = X * N_{sc}^{RB} \text{ (where } N_{sc}^{RB} = 12\text{)},$$

and in accordance with the two illustrated cyclic shift options of $a_0$ and $a_1$. Y=1, 2, 3 or 4 are shown as different options illustrated by Table 2, where a UE 115 can use two different sequences 505 with one cyclic shift to convey one bit (such as a "0" or a "1") if Y=1, can use four different sequences 505 with one cyclic shift to convey two bits (such as "00," "01," and so on) if Y=2, can use eight different sequences 505 with one cyclic shift to convey three bits (such as "000," "001," and so on) if Y=3, or can use eight different sequences 505 with two cyclic shifts to convey four bits (such as "0000," "0001," and so on) if Y=4.

TABLE 2

| HARQ-ACK information bits | | | | |
|---|---|---|---|---|
| Y = 1 | Y = 2 | Y = 3 | Y = 4 | Sequence and cyclic shift |
| 0 | 00 | 000 | 0000 | Base sequence 0 with first cyclic shift |
| 1 | 01 | 001 | 0001 | Base sequence 1 with first cyclic shift |
| | 10 | 010 | 0010 | Base sequence 2 with first cyclic shift |
| | 11 | 011 | 0011 | Base sequence 3 with first cyclic shift |
| | | 100 | 0100 | Base sequence 4 with first cyclic shift |
| | | 101 | 0101 | Base sequence 5 with first cyclic shift |
| | | 110 | 0110 | Base sequence 6 with first cyclic shift |
| | | 111 | 0111 | Base sequence 7 with first cyclic shift |
| | | | 1000 | Base sequence 0 with second cyclic shift |
| | | | 1001 | Base sequence 1 with second cyclic shift |
| | | | 1010 | Base sequence 2 with second cyclic shift |
| | | | 1011 | Base sequence 3 with second cyclic shift |
| | | | 1100 | Base sequence 4 with second cyclic shift |
| | | | 1101 | Base sequence 5 with second cyclic shift |
| | | | 1110 | Base sequence 6 with second cyclic shift |
| | | | 1111 | Base sequence 7 with second cyclic shift |

In accordance with Table 2, different base sequence and cyclic shift combinations or pairs correspond to different bit streams (such as different series or permutations of bit values), where a "0" may correspond to a NACK and a "1" may correspond to an ACK. In some implementations, and as shown in the sequence mapping 500, the UE 115 may transmit the sequence 505-*a* associated with a base sequence 0 using a cyclic shift $a_0$ (which may denote a first cyclic shift of two available cyclic shifts) to indicate a bit stream of "0000." Additionally, or alternatively, the UE 115 may transmit the sequence 505-*b* associated with the base sequence 0 using a cyclic shift $a_1$ (which may denote a second cyclic shift of the two available cyclic shifts) to indicate a bit stream of "1000."

In some aspects, such use of one sequence 505 spanning the multiple PRBs 510 may be useful if a channel between two communicating UEs 115 is flat during the PRBs 510 (which may be consecutive PRBs 510). Otherwise, the UE 115 may achieve a higher likelihood for orthogonality between sequences 505 in accordance with using multiple length-12 sequence repetitions across the PRBs 510, as illustrated by and described with reference to FIGS. 3 and 4. In other words, orthogonality among different base sequences as well as different cyclic shifts may not be guaranteed for non-flat (such as varying) channel conditions and, in some implementations, the UE 115 may select whether to use multiple length-12 sequence repetitions or one longer sequence in accordance with one or more channel measurements.

Figure 6:
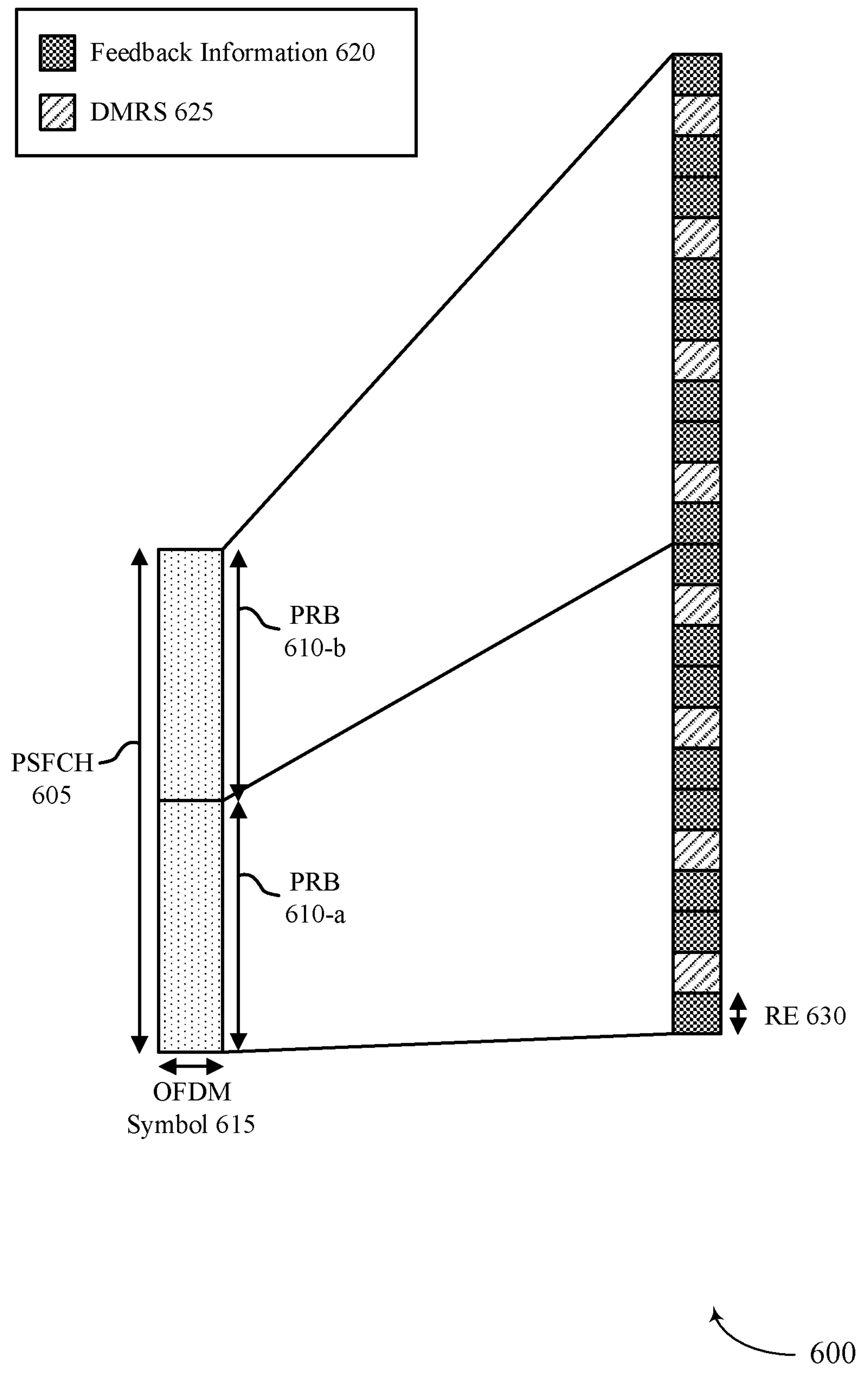
FIG. 6 shows an example multiplexing pattern that supports multi-bit feedback via a sidelink feedback channel.

FIG. 6 shows an example multiplexing pattern 600 that supports multi-bit feedback via a sidelink feedback channel. The multiplexing pattern 600 may implement or be implemented to realize aspects of the wireless communications system 100 or the signaling diagram 200. For example, a UE 115, which may be an example of a UE 115 as illustrated by and described with reference to FIG. 1 or a UE 115-*b* as illustrated by and described with reference to FIG. 2, may employ the multiplexing pattern 600 to support relatively larger payloads for a PSFCH 605 (such as multi-bit payloads for a PSFCH 605) and more than one PRB 610 (such as both the PRB 610-*a* and the PRB 610-*b*) in an OFDM symbol 615. In some implementations, the UE 115 may employ the multiplexing pattern 600 to support a PF2-like PSFCH 605.

For example, the UE 115 may frequency division multiplex feedback information 620 (such as feedback bits or HARQ-ACK information bits) with a demodulation reference signal (DMRS) 625 in the OFDM symbol 615 (which may be an example of a PSFCH symbol). In some implementations, the UE 115 may allocate the feedback information 620 to various resource elements 630 (shown as "RE 630" in FIG. 6) and may allocate the DMRS 625 to other resource elements 630 in accordance with the multiplexing pattern 600.

Prior to or after multiplexing the feedback information 620 with the DMRS 625, the UE 115 may apply a coding scheme to the feedback information 620 (such as to multiple feedback bits) in accordance with a quantity of bits included in or otherwise conveyed by the feedback information 620. In other words, such as a specific coding scheme that the UE 115 applies to the feedback information 620 may be associated with or depend on a quantity of bits conveyed by the feedback information 620. Additional details relating to such coding schemes are illustrated by and described in more detail with reference to FIGS. 7 and 8.

Figure 7:
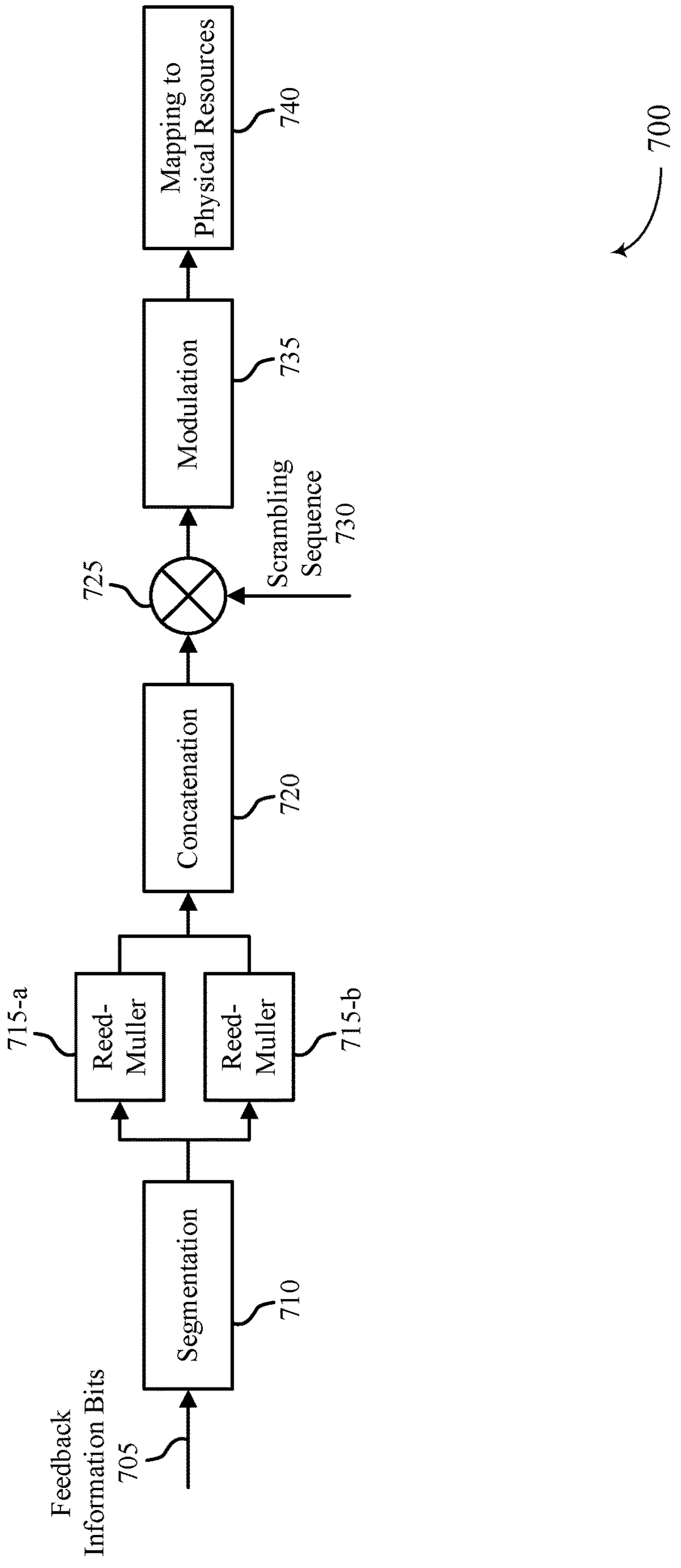
FIGS. 7 and 8 show example coding schemes that support multi-bit feedback via a sidelink feedback channel.

FIG. 7 shows an example coding scheme 700 that supports multi-bit feedback via a sidelink feedback channel. The coding scheme 700 may implement or be implemented to realize aspects of the wireless communications system 100, the signaling diagram 200, or the multiplexing pattern 600. For example, a UE 115, which may be an example of a UE 115 as illustrated by and described with reference to FIG. 1 or a UE 115-*b* as illustrated by and described with reference to FIG. 2, may employ the coding scheme 700 to achieve a channel coding associated with a reduced error correction overhead. In some implementations, such as the UE 115 may apply a Reed-Muller code to a set of feedback information bits 705 to reduce a cyclic redundancy check (CRC) overhead regardless of a size or quantity of the feedback information bits 705.

For example, the feedback information bits 705 may include X bits and, if X is less than or equal to a threshold quantity of bits (such as 11 bits), the UE 115 may code the feedback information bits 705 using a Reed-Muller code without segmentation. Additional details relating to implementations in which X is less than or equal to the threshold quantity of bits (such as 11 bits) are illustrated by and described with reference to FIG. 8.

Alternatively, if X is greater than a threshold quantity of bits (such as 11 bits), the UE 115 may segment the X bits into multiple segments or parts at 710 and, at 715, may encode each segment or part using a Reed-Muller code independently or separately. For example, at 715-*a*, the UE 115 may encode a first segment or part of the feedback information bits 705 via a Reed-Muller code and, at 715-*b*, the UE 115 may encode a second segment or part of the feedback information bits 705 via a Reed-Muller code. In such examples in which X is greater than the threshold quantity of bits and in which the UE 115 divides the feedback information bits 705 into two segments or parts (such as if $11<X\leq 22$), the first segment or part may include floor(X/2) or ceil(X/2) bits and the second segment or part may include X−floor(X/2) or X−ceil(X/2) bits.

At 720, the UE 115 may concatenate the feedback information bits 705 (such as may concatenate the encoded first segment or part with the encoded second segment or part) and, at 725, the UE 115 may scramble the encoded and concatenated feedback information bits 705 using a scrambling sequence 730. At 735, the UE 115 may modulate the feedback information bits 705 and, at 740, the UE 115 may map the modulated feedback information bits 705 to physical resources (such as to time and frequency resources, such as in accordance with the multiplexing pattern 600).

Figure 8:
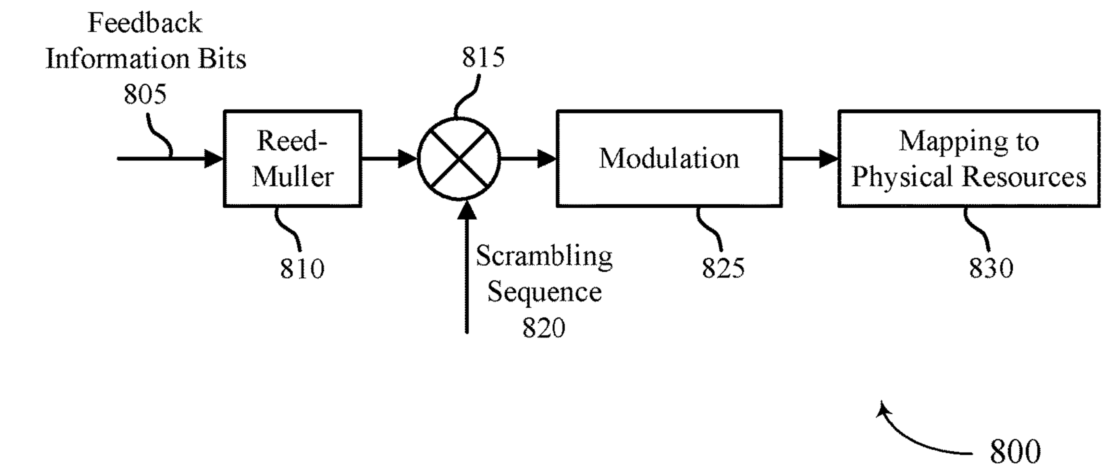
Figure 8:
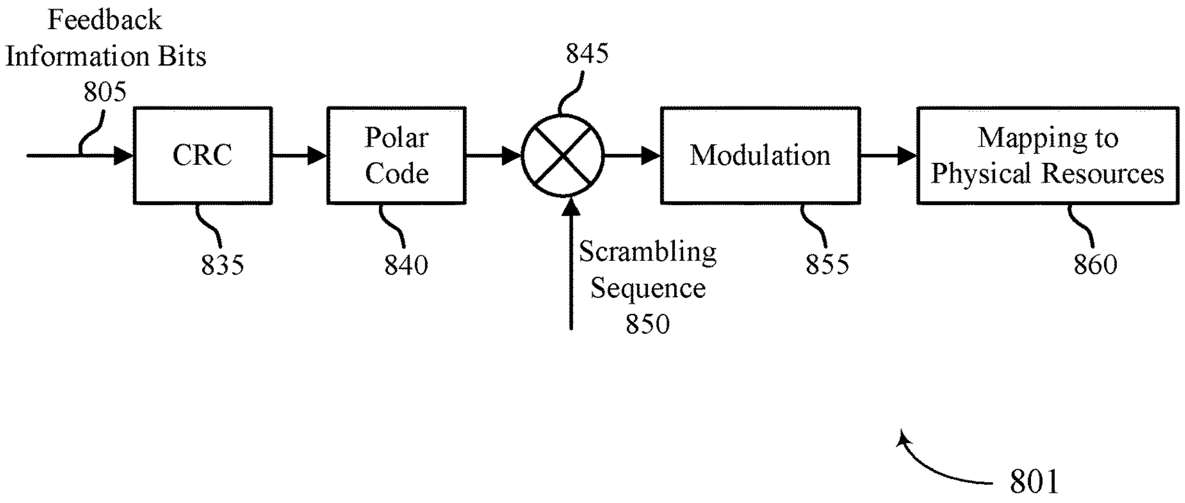

FIG. 8 shows example coding schemes 800 and 801 that support multi-bit feedback via a sidelink feedback channel. The coding schemes 800 and 801 may implement or be implemented to realize aspects of the wireless communications system 100, the signaling diagram 200, or the multiplexing pattern 600. For example, a UE 115, which may be an example of a UE 115 as illustrated by and described with reference to FIG. 1 or a UE 115-*b* as illustrated by and described with reference to FIG. 2, may employ one of the coding schemes 800 or 801 to achieve a channel coding associated with a reduced or otherwise small error correction overhead. In some implementations, such as the UE 115 may apply a Reed-Muller code to a set of feedback information bits 805 to reduce a CRC overhead if a size or quantity of the feedback information bits 805 is less than or equal to a threshold quantity of bits (such as 11 bits) or may include one or more CRC bits and apply a polar code to the set of feedback information bits 805 if the size or quantity of the feedback information bits 805 is greater than the threshold quantity of bits.

In other words, such as the UE 115 may use either a Reed-Muller code or a polar code to encode the feedback information bits 805 depending on a size of the feedback information bits 805. If the quantity of the feedback information bits 805 is less than or equal to the threshold quantity of bits (such as is less than or equal to 11 bits), and as shown by the coding scheme 800, the UE 115 may refrain from adding CRC prior to channel coding and may use a Reed-Muller code. In such implementations, the UE 115 may apply a Reed-Muller code to the feedback information bits 805 at 810 and may scramble the encoded feedback information bits 805 at 815 using a scrambling sequence 820. At 825, the UE 115 may modulate the feedback information bits 805 and, at 830, the UE 115 may map the modulated feedback information bits 805 to physical resources (such as to time and frequency resources, such as in accordance with the multiplexing pattern 600).

Alternatively, if the quantity of feedback information bits 805 is greater than the threshold quantity of bits (such as greater than 11 bits), and as shown by the coding scheme 801, the UE 115 may add one or more CRC bits to the feedback information bits 805 and use polar coding for channel coding. In such implementations, the UE 115 may add one or more CRC bits to the feedback information bits 805 at 835 and may apply a polar code to the feedback information bits 805 and the one or more CRC bits at 840. At 845, the UE 115 may scramble the encoded feedback information bits 805 and the one or more CRC bits using a scrambling sequence 850 (which may be a same or different scrambling sequence than the scrambling sequence 820). At 855, the UE 115 may modulate the feedback information bits and the one or more CRC bits and, at 860, the UE 115 may map the modulated feedback information bits 805 and the one or more CRC bits to physical resources (such as to time and frequency resources, such as in accordance with the multiplexing pattern 600).

Figure 9:
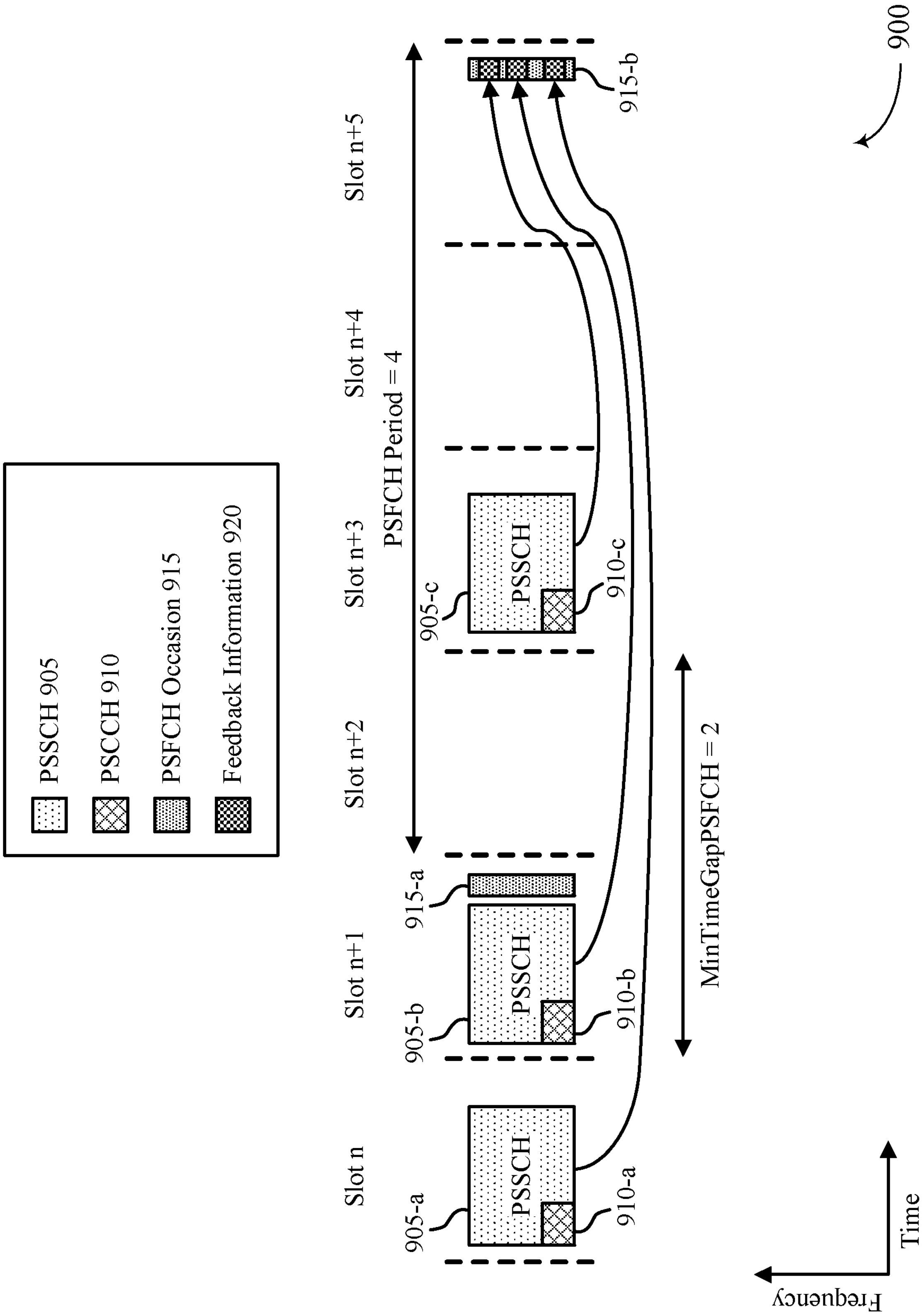
FIG. 9 shows an example communication timeline that supports multi-bit feedback via a sidelink feedback channel.

FIG. 9 shows an example communication timeline 900 that supports multi-bit feedback via a sidelink feedback channel. The communication timeline 900 may implement or be implemented to realize aspects of the wireless communications system 100, the signaling diagram 200, the sequence mapping 300, the sequence mapping 400, the sequence mapping 500, the multiplexing pattern 600, the coding scheme 700, or the coding scheme 800. For example, a UE 115, which may be an example of a UE 115 as illustrated by and described with reference to FIG. 1 or a UE 115-*b* as illustrated by and described with reference to FIG. 2, may select a PSFCH occasion 915 over which to transmit feedback information 920 (such as multi-bit feedback information) using multiple PRBs in accordance with the communication timeline 900.

The UE 115 may select or otherwise determine an index of a PSFCH resource (which may be an example of or include a PSFCH resource 230) for the feedback information 920 in response to the one or more sidelink data transmissions over one or more PSSCHs 905 (such as a PSSCH 905-*a*, a PSSCH 905-*b*, and a PSSCH 905-*c*). In some implementations, the UE 115 may select or determine the index of the PSFCH resource as $$(P_{ID} + M_{ID})\text{mod}R^{PSFCH}_{PRB,CS}.$$

$P_{ID}$ may be a physical source ID from SCI 2-A or SCI 2-B for a PSSCH 905 (which may refer to the PSSCH 905-*a*, the PSSCH 905-*b*, and the PSSCH 905-*c* generally or collectively) and $M_{ID}$ may be set to 0 or correspond to an identity of the UE 115 receiving the PSSCH 905. In some aspects, for unicast or groupcast option 1 (NACK-based feedback), $M_{ID}$=0 and the UE 115 may ACK or NACK, or NACK only, at a source ID-dependent PSFCH resource in a corresponding resource pool. For groupcast option 2 (ACK/NACK-based feedback), each receiving UE 115 may select one PSFCH resource from a corresponding resource pool and transmit an indication of an ACK or a NACK via the selected PSFCH resource.

In some implementations, for multiple ACK or NACK indications in one PSFCH resource, the UE 115 may select or determine a PSFCH occasion 915 associated with each PSSCH 905 and may select or determine a PSFCH occasion 915 for the multi-bit feedback information 920 in accordance with a PSFCH occasion 915 associated with a PSSCH 905 scheduled by a last SCI. For example, the UE 115 may receive a first SCI over a PSCCH 910-*a* scheduling a first PSSCH 905-*a* during a slot n, a second SCI over a PSCCH 910-*b* scheduling a second PSSCH 905-*b* during a slot n+1, and a third SCI over a PSCCH 910-*c* scheduling a third PSSCH 905-*c* during a slot n+3. The UE 115 may identify or determine that the PSSCH 905-*a* and the PSSCH 905-*b* are not associated with the PSFCH occasion 915-*a* and are instead associated with a PSFCH occasion 915-*b* in accordance with a MinTimeGapPSFCH parameter being equal to 2 (such that time gap between a PSSCH 905 and an associated PSFCH occasion 915 is at least 2 slots) and a PSFCH period being equal to 4 (such that PSFCH occasions 915 occur every 4 slots). Further, the UE 115 may identify or determine that the PSSCH 905-*c*, which may be scheduled by a last, in time, SCI, is associated with the PSFCH occasion 915-*b*. For each of the PSSCH 905-*a*, the PSSCH 905-*b*, and the PSSCH 905-*c*, the UE may determine a corresponding PSFCH resource in the PSFCH occasion 915-*b*. For example, a first PSFCH resource in the PSFCH occasion 915-*b* can be determined for the PSSCH 905-*a*, a second PSFCH resource in the PSFCH occasion 915-*b* can be determined for the PSSCH 905-*b*, and a third PSFCH resource in the PSFCH occasion 915-*b* can be determined for the PSSCH 905-*c*. As such, the UE 115 may transmit the multi-bit feedback information 920 over the third PSFCH resource (as this is the PSFCH resource associated with the PSSCH 905-*c* scheduled by the last SCI 910-*c*) during the PSFCH occasion 915-*b*.

Figure 10:
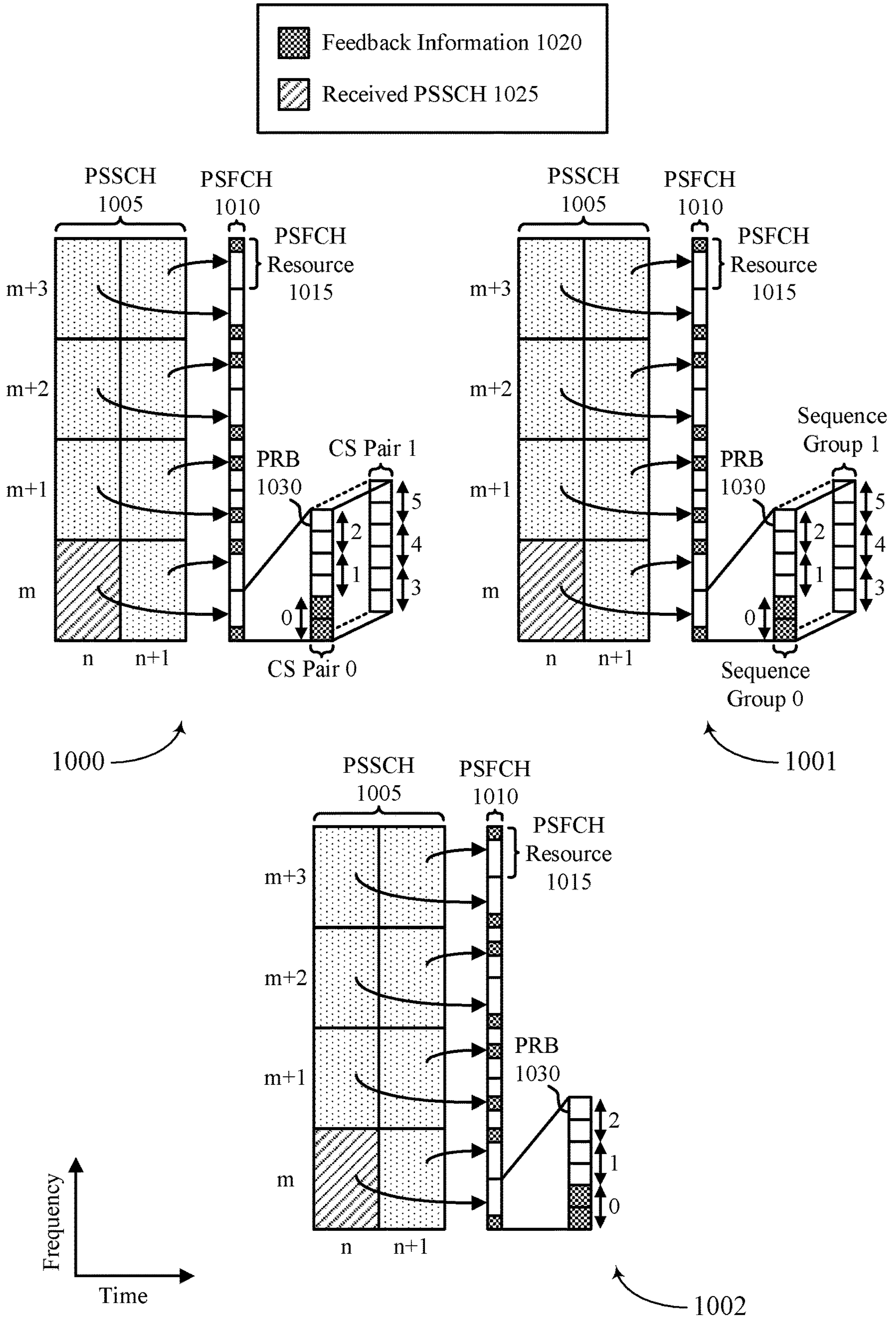
FIG. 10 shows example physical sidelink feedback channel (PSFCH) multiplexing schemes that support multi-bit feedback via a sidelink feedback channel.

FIG. 10 shows example PSFCH multiplexing schemes 1000, 1001, and 1002 that supports multi-bit feedback via a sidelink feedback channel. The PSFCH multiplexing schemes 1000, 1001, and 1002 may implement or be implemented to realize aspects of the wireless communications system 100, the signaling diagram 200, the sequence mapping 300, the sequence mapping 400, the sequence mapping 500, the multiplexing pattern 600, the coding scheme 700, the coding schemes 800 or 801, or the communication timeline 900. For example, a UE 115, which may be an example of a UE 115 as illustrated by and described with reference to FIG. 1 or a UE 115-*b* as illustrated by and described with reference to FIG. 2, may leverage the PSFCH multiplexing schemes 1000, 1001, and 1002 to identify or otherwise ascertain a value for $N_{PSFCH}$.

In some implementations, such as the UE 115 may select a value for $N_{PSFCH}$, which may be referred to herein as a second value associated with a quantity of dimensions in which PSFCH resources 1015 can be multiplexed, in accordance with one of various options. The option according to which the UE 115-*b* selects a value for $N_{PSFCH}$ may vary in accordance with whether the UE 115-*b* uses multiple length-12 sequence repetitions, one relatively longer sequence, or a coding scheme to convey multi-bit feedback information 1020. As shown in the PSFCH multiplexing schemes 1000, 1001, and 1002, a set of PSSCHs 1005 may be present across a resource grid associated with slots n and n+1 and subchannels m, m+1, m+2, and m+3. Each of the PSSCHs 1005 may correspond to a different PSFCH resource 1015 within a PSFCH slot 1010. For a received PSSCH 1025 (corresponding to a PSSCH located in slot n and subchannel m), the UE 115 may transmit multi-bit feedback information 1020 over multiple PRBs 1030 within a corresponding PSFCH resource 1015. A quantity of dimensions in which that PSFCH resource 1015 can be multiplexed, and thus a value of $N_{PSFCH}$, may vary across the PSFCH multiplexing schemes 1000, 1001, and 1002.

As illustrated by the PSFCH multiplexing scheme 1000, which may be associated with implementations in which the UE 115 uses multiple length-12 sequence repetitions across multiple PRBs 1030 and uses different cyclic shift pairs to differentiate between an ACK or a NACK for each sequence, a quantity of PSFCH resources 1015 that can be multiplexed may depend on or be associated with a quantity of cyclic shift pairs (which may be configured per resource pool). In other words, $N_{PSFCH}$ may be set equal to a quantity of cyclic shift pairs, which may be configured per resource pool. As such, if the UE 115 supports two cyclic shift pairs, $N_{PSFCH}$=2. In such implementations, within a PSFCH resource pool, a PSFCH resource 1015 may be indexed by RBG index first and by cyclic shift pair index second. Further, although shown as support two cyclic shift pairs, the UE 115 may support any number of cyclic shift pairs.

As illustrated by the PSFCH multiplexing scheme 1001, which may be associated with implementations in which the UE 115 uses one length-N sequence spanning multiple PRBs 1030 and uses different base sequence and cyclic shift combinations to differentiate between different sequences of ACKs, NACKs, or a combination of ACKs and NACKs, a quantity of PSFCH resources 1015 that can be multiplexed may depend on or be associated with a quantity of sequence groups G (per resource pool). In other words, $N_{PSFCH}$ may be set equal to a quantity of sequence groups (which may be denoted by G) per resource pool, which may be equal to $$X * N_{sc}^{RB} * M_{CS} / 2^{Y}.$$

As such, if the UE 115 supports two sequence groups (such as G=2), $N_{PSFCH}$=2. In such implementations, within a PSFCH resource pool, a PSFCH resource 1015 may be indexed by RBG index first and by sequence group index second. Further, although shown as support two sequence groups, the UE 115 may support any number of sequence groups.

As illustrated by the PSFCH multiplexing scheme 1002, which may be associated with implementations in which the UE 115 uses a coding scheme to convey multi-bit feedback information 1020 with low or minimal CRC overhead, a quantity of PSFCH resources 1015 that can be multiplexed may be equal to 1. Accordingly, in the example of the PSFCH multiplexing scheme 1002, $N_{PSFCH}$=1 ($N_{PSFCH}$ may be statically fixed to 1). In such implementations, within a PSFCH resource pool, a PSFCH resource 1015 may be indexed by RBG index.

Figure 11:
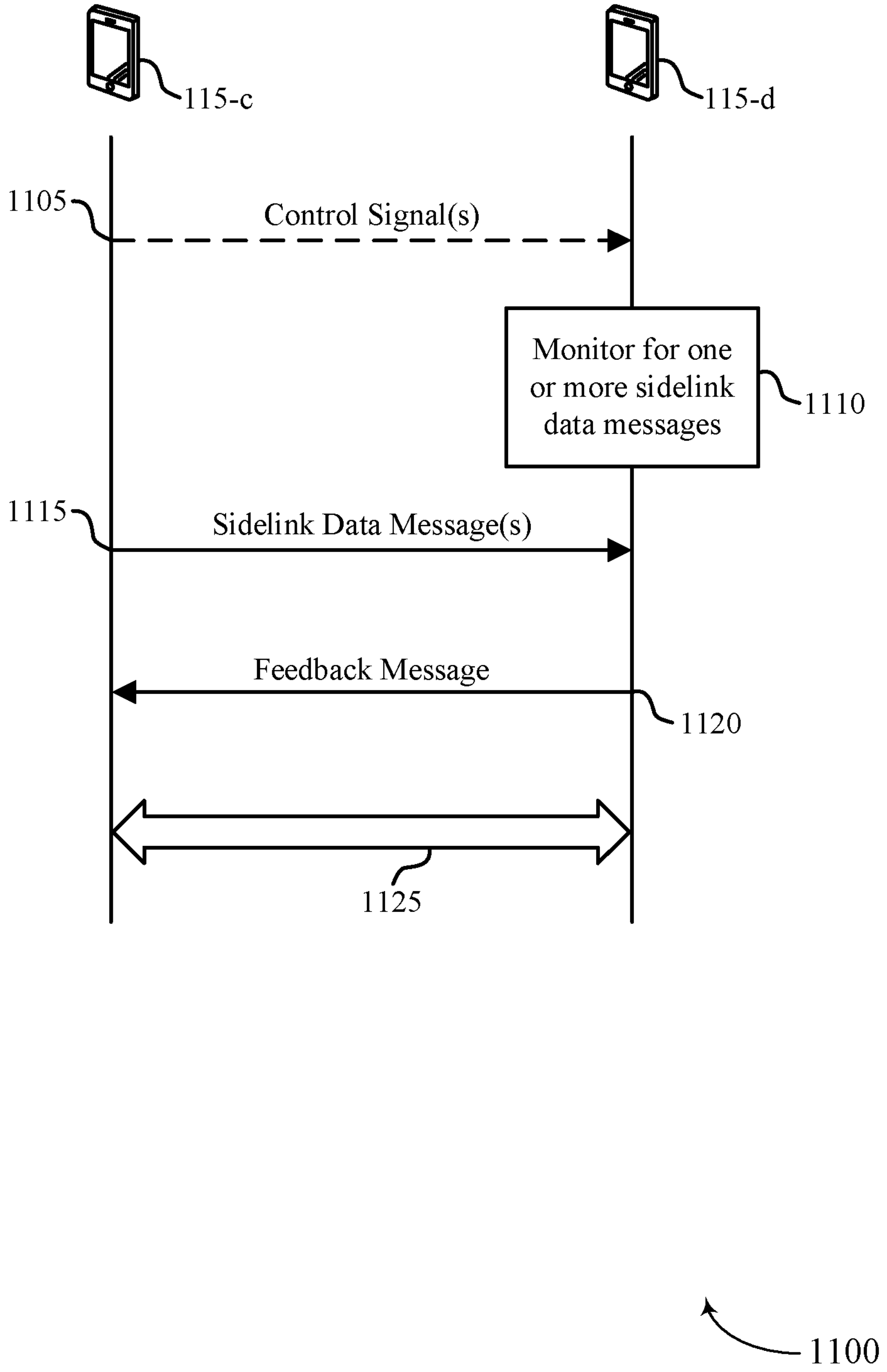
FIG. 11 shows an example process flow that supports multi-bit feedback via a sidelink feedback channel.

FIG. 11 shows an example process flow 1100 that supports multi-bit feedback via a sidelink feedback channel. The process flow 1100 may implement or be implemented to realize aspects of the wireless communications system 100, the signaling diagram 200, the sequence mapping 300, the sequence mapping 400, the sequence mapping 500, the multiplexing pattern 600, the coding scheme 700, the coding schemes 800 or 801, the communication timeline 900, or the PSFCH multiplexing schemes 1000, 1001, or 1002. For example, the process flow 1100 illustrates communication between a UE 115-*c* and a UE 115-*d*, each of which may be examples of UEs 115 as illustrated by and described with reference to FIGS. 1-10. More specifically, the UE 115-*c* and the UE 115-*d* may be examples of the UE 115-*a* and the UE 115-*b*, respectively, as illustrated by and described with reference to FIG. 2. In some implementations, the UE 115-*d* may transmit multi-bit feedback to the UE 115-*c* over multiple resource blocks, such as PRBs, of a PSFCH.

In the following description of the process flow 1100, the operations may be performed (such as reported or provided) in a different order than the order shown, or the operations performed by the example devices may be performed in different orders or at different times. Some operations also may be left out of the process flow 1100, or other operations may be added to the process flow 1100. Further, although some operations or signaling may be shown to occur at different times for discussion purposes, these operations may actually occur at the same time.

At 1105, the UE 115-*c* may transmit, to the UE 115-*d*, one or more control signals scheduling one or more sidelink data messages. Additionally, or alternatively, a network entity may indicate to one or both of the UE 115-*c* and the UE 115-*d* that the UE 115-*c* is scheduled to transmit one or more sidelink data messages to the UE 115-*d*. In some implementations, the one or more control signals may indicate a request for the UE 115-*d* to transmit feedback associated with the one or more sidelink data messages to the UE 115-*c*. The one or more control signals may include any combination of one or more SCI-1 messages, one or more SCI-2 messages, or PC5-RRC messages. For example, an SCI message (which may refer to or include SCI-1 and SCI-2) may schedule one sidelink data message (such as one PSSCH). As such, the UE 115-*d* may receive a different SCI message for each scheduled sidelink data message.

At 1110, the UE 115-*d* may monitor for the one or more sidelink data messages. For example, the UE 115-*d* may monitor a time and frequency resource allocation for the one or more sidelink data messages, such as one or more PSSCHs.

At 1115, the UE 115-*c* may transmit, to the UE 115-*d*, the one or more sidelink data messages. In some implementations, the UE 115-*c* may transmit the one or more sidelink data messages over one or more PSSCHs. The UE 115-*d*, in accordance with monitoring for the one or more sidelink data messages, may attempt to receive each of the one or more sidelink data messages. The UE 115-*d* may successfully receive all of the sidelink data messages, successfully receive a portion of the sidelink data messages (and likewise fail to receive another portion of the sidelink data messages), or may fail to receive all of the sidelink data messages.

At 1120, the UE 115-*d* may transmit, to the UE 115-*c* over multiple resource blocks (such as PRBs) of a PSFCH resource, a feedback message associated with the one or more sidelink data messages. In some implementations, the feedback message may indicate multiple feedback bits (such as multiple ACKs, multiple NACKs, or a combination of ACKs and NACKs) associated with the one or more sidelink data messages. The UE 115-*d* may use a sequence-based PSFCH resource and may convey the multiple feedback bits via various sequence types or coding schemes, as illustrated by and described in more detail with reference to FIGS. 2-8. In some implementations, the UE 115-*d* may select the PSFCH resource over which to transmit the feedback message in accordance with one or more parameters associated with conveying multiple feedback bits via a PSFCH, as illustrated by and described in more detail with reference to FIGS. 2, 9, and 10.

At 1125, the UE 115-*c* and the UE 115-*d* may communicate in accordance with the multiple feedback bits associated with the one or more sidelink data messages. In some implementations, such as the UE 115-*c* may retransmit one or more sidelink data messages for which the UE 115-*d* provided a NACK at 1120. Additionally, or alternatively, the UE 115-*c* may schedule and transmit new data to the UE 115-*d* if the UE 115-*d* provided one or more ACKs at 1120.

Figure 12:
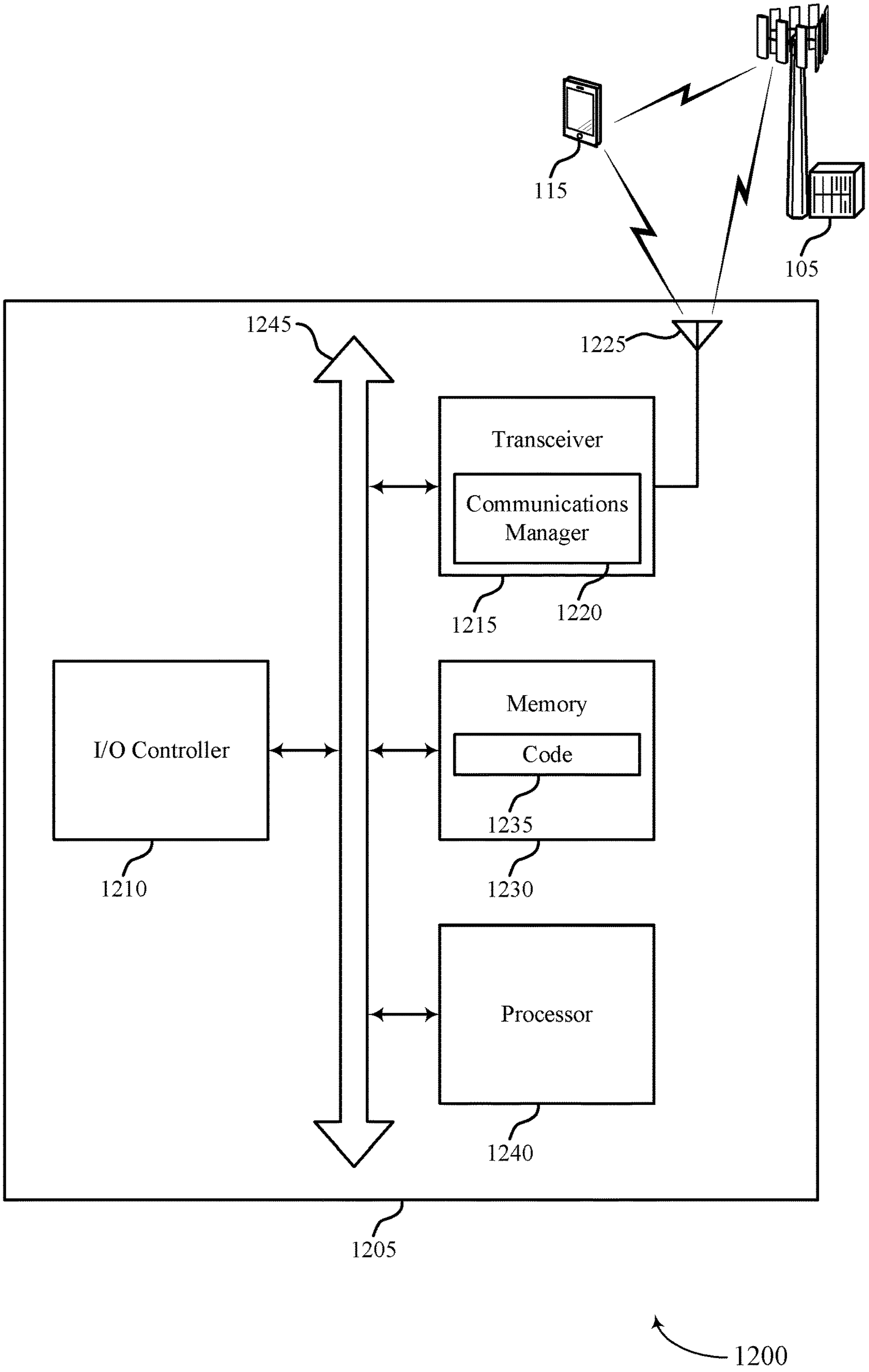
FIG. 12 shows a block diagram of an example device that supports multi-bit feedback via a sidelink feedback channel.

FIG. 12 shows a block diagram 1200 of an example device 1205 that supports multi-bit feedback via a sidelink feedback channel. The device 1205 may communicate wirelessly with one or more network entities (such as one or more components of one or more BSs 105), UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (such as operatively, communicatively, functionally, electronically, electrically) via one or more buses (such as a bus 1245).

The I/O controller 1210 may manage input and output signals for the device 1205. The I/O controller 1210 also may manage peripherals not integrated into the device 1205. In some implementations, the I/O controller 1210 may represent a physical connection or port to an external peripheral. In some implementations, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some implementations, the I/O controller 1210 may be implemented as part of a processor or processing system, such as the processor 1240. In some implementations, a user may interact with the device 1205 via the I/O controller 1210 or via hardware components controlled by the I/O controller 1210.

In some implementations, the device 1205 may include a single antenna 1225. However, in some other implementations, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 also may include a modem to modulate the packets, to provide the modulated packets to one or more antennas 1225 for transmission, and to demodulate packets received from the one or more antennas 1225.

In some implementations, the transceiver 1215 may include one or more interfaces, such as one or more interfaces coupled with the one or more antennas 1225 that are configured to support various receiving or obtaining operations, or one or more interfaces coupled with the one or more antennas 1225 that are configured to support various transmitting or outputting operations, or a combination thereof. In some implementations, the transceiver 1215 may include or be configured for coupling with one or more processors or memory components that are operable to perform or support operations in accordance with received or obtained information or signals, or to generate information or other signals for transmission or other outputting, or any combination thereof. In some implementations, the transceiver 1215, or the transceiver 1215 and the one or more antennas 1225, or the transceiver 1215 and the one or more antennas 1225 and one or more processors or memory components (such as the processor 1240, or the memory 1230, or both), may be included in a chip or chip assembly that is installed in the device 1205.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some implementations, the code 1235 may not be directly executable by the processor 1240 but may cause a computer (such as when compiled and executed) to perform functions described herein. In some implementations, the memory 1230 may contain, among other things, a basic I/O system (BIOS) which may control basic hardware or software operation such as the interaction with peripheral components or devices.

The processor 1240 may be any one or more suitable processors capable of executing scripts or instructions of one or more software programs stored in the device 1205 (such as within the memory 1230). In some implementations, the processor 1240 may be a component of a processing system. A processing system may generally refer to a system or series of machines or components that receives inputs and processes the inputs to produce a set of outputs (which may be passed to other systems or components of, such as the device 1205). For example, a processing system of the device 1205 may refer to a system including the various other components or subcomponents of the device 1205, such as the processor 1240, or the transceiver 1215, or the communications manager 1220, or other components or combinations of components of the device 1205.

The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

The communications manager 1220 may support wireless communication at a first UE in accordance with examples as disclosed herein. For example, the communications manager 1220 may be configured as or otherwise support a means for receiving, from a second UE, one or more control signals scheduling one or more sidelink data messages. The communications manager 1220 may be configured as or otherwise support a means for transmitting, to the second UE over a set of multiple resource blocks of a sidelink feedback channel resource, a feedback message associated with the one or more sidelink data messages, the feedback message indicating a set of multiple feedback bits associated with the one or more sidelink data messages. The communications manager 1220 may be configured as or otherwise support a means for communicating with the second UE in accordance with the set of multiple feedback bits associated with the one or more sidelink data messages.

In some implementations, the communications manager 1220 may be configured as or otherwise support a means for applying a different cyclic shift to each sequence of a set of multiple sequences to indicate a positive ACK or a NACK for that sequence, where each sequence of the set of multiple sequences corresponds to one of the set of multiple resource blocks of the sidelink feedback channel resource, and where transmitting the feedback message includes transmitting the cyclically shifted set of multiple sequences over the set of multiple resource blocks.

In some implementations, each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

In some implementations, each sequence of the set of multiple sequences is associated with a same base sequence.

In some implementations, the communications manager 1220 may be configured as or otherwise support a means for applying a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where transmitting the feedback message includes transmitting the cyclically shifted single sequence over the set of multiple resource blocks.

In some implementations, a quantity of base sequences associated with the single sequence corresponds to the length of the single sequence; and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

In some implementations, each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

In some implementations, different base sequence and cyclic shift combinations correspond to different bit values of the set of multiple feedback bits; and the different bit values correspond to different permutations of one or both of ACKs and NACKs.

In some implementations, the communications manager 1220 may be configured as or otherwise support a means for applying a coding scheme to the set of multiple feedback bits in accordance with a quantity of the set of multiple feedback bits. In some implementations, the communications manager 1220 may be configured as or otherwise support a means for multiplexing the set of multiple feedback bits with a DMRS in a symbol of the sidelink feedback channel resource, where transmitting the feedback message includes transmitting a coded set of multiple feedback bits multiplexed with the DMRS.

In some implementations, to support applying the coding scheme to the set of multiple feedback bits, the communications manager 1220 may be configured as or otherwise support a means for applying a Reed-Muller code to the set of multiple feedback bits if the quantity of the set of multiple feedback bits is less than or equal to a threshold quantity of feedback bits. In some implementations, to support applying the coding scheme to the set of multiple feedback bits, the communications manager 1220 may be configured as or otherwise support a means for segmenting the set of multiple feedback bits into multiple segments of feedback bits if the quantity of the set of multiple feedback bits is greater than the threshold quantity of feedback bits and applying the Reed-Muller code to each of the multiple segments of feedback bits independently.

In some implementations, to support applying the coding scheme to the set of multiple feedback bits, the communications manager 1220 may be configured as or otherwise support a means for refraining from adding one or more CRC bits to the set of multiple feedback bits and applying a Reed-Muller code to the set of multiple feedback bits if the quantity of the set of multiple feedback bits is less than or equal to a threshold quantity of feedback bits. In some implementations, to support applying the coding scheme to the set of multiple feedback bits, the communications manager 1220 may be configured as or otherwise support a means for adding the one or more CRC bits to the set of multiple feedback bits and applying a polar code to the set of multiple feedback bits if the quantity of the set of multiple feedback bits is greater than the threshold quantity of feedback bits.

In some implementations, the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

In some implementations, a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair. In some implementations, the quantity of RBGs for each subchannel and slot pair corresponds to a quantity of a set of resource blocks for the sidelink feedback channel in a slot divided by the quantity of the set of multiple resource blocks, a quantity of sidelink shared channel slots corresponding to a sidelink feedback channel slot, and a quantity of a set of multiple subchannels.

In some implementations, the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

In some implementations, an index of the sidelink feedback channel resource corresponds to a remainder of a summation of a physical source identifier and a zero value or a value associated with an identify of the first UE divided by the quantity of sidelink feedback channel resources available for multiplexing.

In some implementations, the communications manager 1220 may be configured as or otherwise support a means for receiving multiple sidelink data messages in accordance with monitoring for the one or more sidelink data messages, where the sidelink feedback channel including the sidelink feedback channel resource capable of carrying the set of multiple feedback bits is selected in accordance with a sidelink shared channel carrying a sidelink data message of the multiple sidelink data messages scheduled by a last, in time, SCI message.

Additionally, or alternatively, the communications manager 1220 may support wireless communication in accordance with examples as disclosed herein. For example, the communications manager 1220 may be configured as or otherwise support a means for transmitting, to a first UE from a second UE, one or more sidelink data messages. The communications manager 1220 may be configured as or otherwise support a means for receiving, from the first UE over a set of multiple resource blocks of a sidelink feedback channel resource, a feedback message associated with the one or more sidelink data messages, the feedback message indicating a set of multiple feedback bits associated with the one or more sidelink data messages. The communications manager 1220 may be configured as or otherwise support a means for communicating with the first UE in accordance with the set of multiple feedback bits associated with the one or more sidelink data messages.

In some implementations, the communications manager 1220 may be configured as or otherwise support a means for decoding the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where receiving the feedback message is associated with decoding the cyclically shifted set of multiple sequences over the set of multiple resource blocks.

In some implementations, each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

In some implementations, each sequence of the set of multiple sequences is associated with a same base sequence.

In some implementations, the communications manager 1220 may be configured as or otherwise support a means for decoding the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where receiving the feedback message is associated with decoding the cyclically shifted single sequence over the set of multiple resource blocks.

In some implementations, a quantity of base sequences associated with the single sequence corresponds to the length of the single sequence and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

In some implementations, each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

In some implementations, different base sequence and cyclic shift combinations correspond to different bit values of the set of multiple feedback bits; and the different bit values correspond to different permutations of one or both of ACKs and NACKs.

In some implementations, the communications manager 1220 may be configured as or otherwise support a means for demultiplexing the set of multiple feedback bits from a DMRS in a symbol of the sidelink feedback channel resource. In some implementations, the communications manager 1220 may be configured as or otherwise support a means for decoding the feedback message using a coding scheme, applied to the set of multiple feedback bits, in accordance with a quantity of the set of multiple feedback bits, where receiving the feedback message is associated with decoding the feedback message using the coding scheme.

In some implementations, to support decoding the feedback message using the coding scheme, the communications manager 1220 may be configured as or otherwise support a means for decoding the set of multiple feedback bits using a Reed-Muller code if the quantity of the set of multiple feedback bits is less than or equal to a threshold quantity of feedback bits. In some implementations, to support decoding the feedback message using the coding scheme, the communications manager 1220 may be configured as or otherwise support a means for segmenting the set of multiple feedback bits into multiple segments of feedback bits and decoding the multiple segments of feedback bits independently using the Reed-Muller code if the quantity of the set of multiple feedback bits is greater than the threshold quantity of feedback bits.

In some implementations, the set of multiple feedback bits exclude one or more CRC bits and are coded in accordance with a Reed-Muller code if the quantity of the set of multiple feedback bits is less than or equal to a threshold quantity of feedback bits, or the set of multiple feedback bits include one or more CRC bits and are coded in accordance with a polar code if the quantity of the set of multiple feedback bits is greater than the threshold quantity of feedback bits.

In some implementations, the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

In some implementations, a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair. In some implementations, the quantity of RBGs for each subchannel and slot pair corresponds to a quantity of a set of resource blocks for the sidelink feedback channel in a slot divided by the quantity of the set of multiple resource blocks, a quantity of sidelink shared channel slots corresponding to a sidelink feedback channel slot, and a quantity of a set of multiple subchannels.

In some implementations, the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

In some implementations, an index of the sidelink feedback channel resource corresponds to a remainder of a summation of a physical source identifier and a zero value or a value associated with an identify of the first UE divided by the quantity of sidelink feedback channel resources available for multiplexing.

In some implementations, the communications manager 1220 may be configured as or otherwise support a means for transmitting multiple sidelink data messages, where the sidelink feedback channel including the sidelink feedback channel resource capable of carrying the set of multiple feedback bits is selected in accordance with a sidelink shared channel carrying a sidelink data message of the multiple sidelink data messages scheduled by a last, in time, SCI message.

In some implementations, the communications manager 1220 may be configured to perform various operations (such as receiving, monitoring, transmitting) using or otherwise in cooperation with the transceiver 1215, the one or more antennas 1225, or any combination thereof. Although the communications manager 1220 is illustrated as a separate component, in some implementations, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multi-bit feedback via a sidelink feedback channel as described herein, or the processor 1240 and the memory 1230 may be otherwise configured to perform or support such operations.

Figure 13:
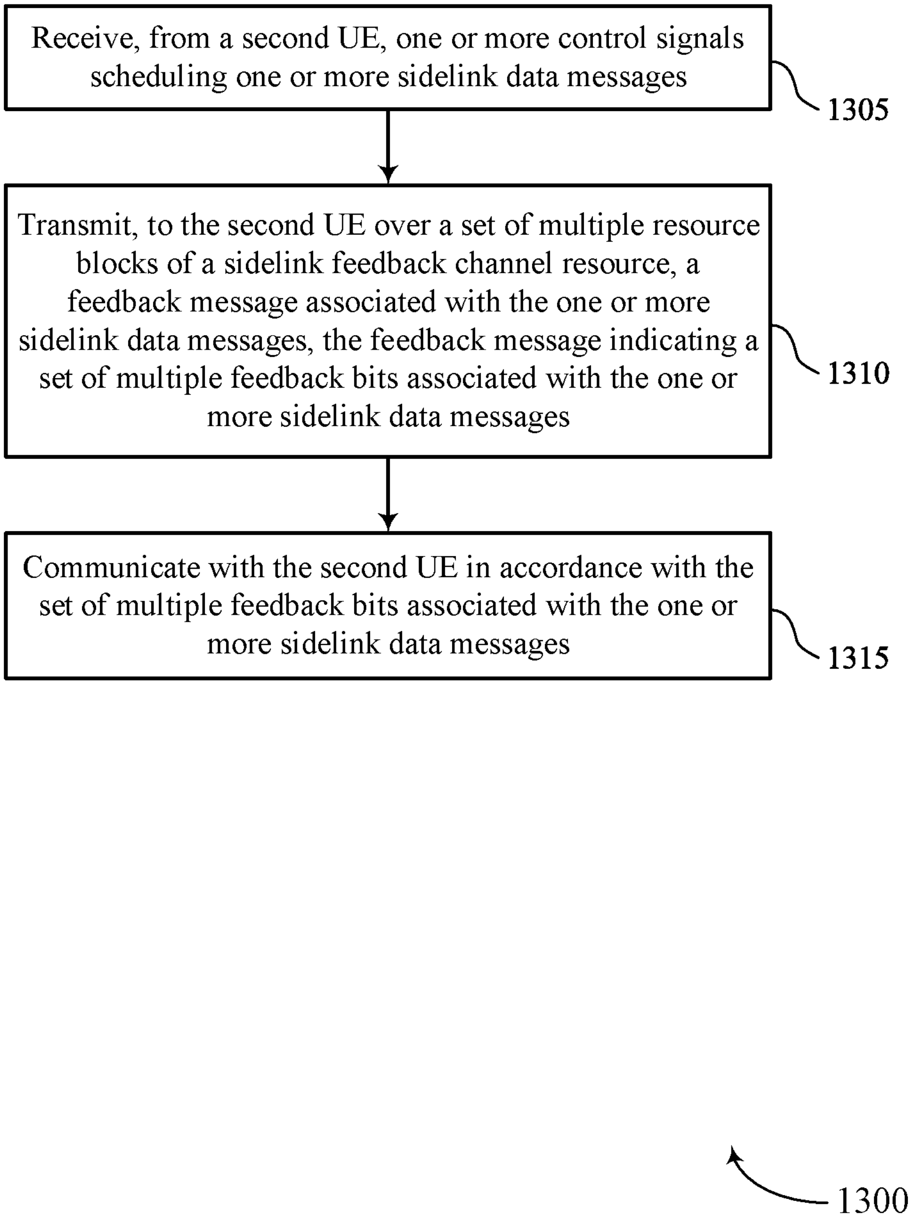
FIGS. 13 and 14 show flowcharts illustrating example methods that support multi-bit feedback via a sidelink feedback channel.

FIG. 13 shows a flowchart illustrating an example method 1300 that supports multi-bit feedback via a sidelink feedback channel. The operations of the method 1300 may be implemented by a UE or its components as described herein. For example, the operations of the method 1300 may be performed by a UE 115 as described with reference to FIGS. 1-12. In some implementations, a UE may execute a set of instructions to control the functional elements of the UE to perform the described functions. Additionally, or alternatively, the UE may perform aspects of the described functions using special-purpose hardware.

At 1305, the method may include receiving, from a second UE, one or more control signals scheduling one or more sidelink data messages. The operations of 1305 may be performed in accordance with examples as disclosed herein. In some implementations, aspects of the operations of 1305 may be performed by a communications manager 1220 as described with reference to FIG. 12.

At 1310, the method may include transmitting, to the second UE over a set of multiple resource blocks of a sidelink feedback channel resource, a feedback message associated with the one or more sidelink data messages, the feedback message indicating a set of multiple feedback bits associated with the one or more sidelink data messages. The operations of 1310 may be performed in accordance with examples as disclosed herein. In some implementations, aspects of the operations of 1310 may be performed by a communications manager 1220 as described with reference to FIG. 12.

At 1315, the method may include communicating with the second UE in accordance with the set of multiple feedback bits associated with the one or more sidelink data messages. The operations of 1315 may be performed in accordance with examples as disclosed herein. In some implementations, aspects of the operations of 1315 may be performed by a communications manager 1220 as described with reference to FIG. 12.

Figure 14:
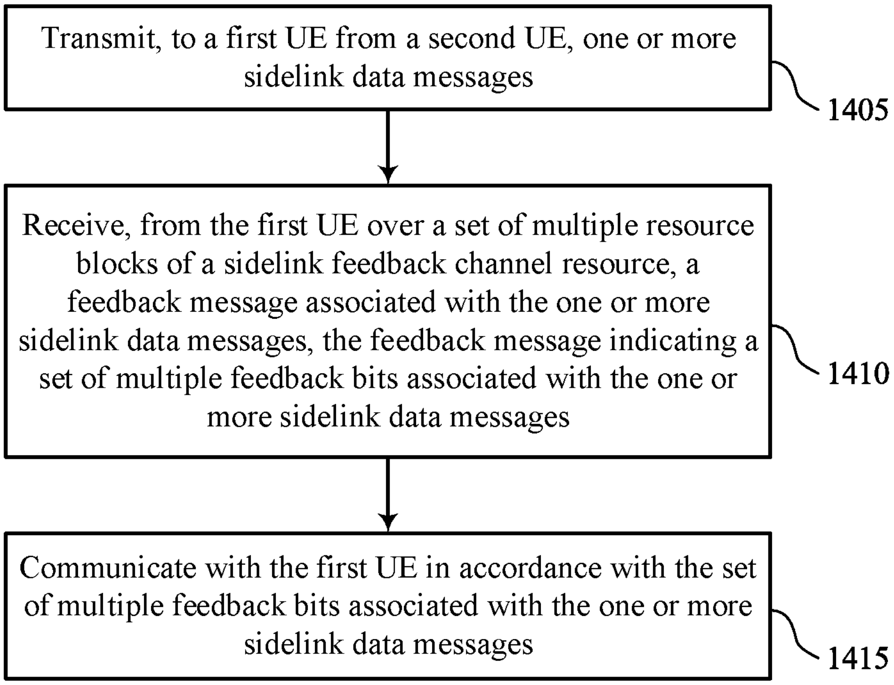

FIG. 14 shows a flowchart illustrating an example method 1400 that supports multi-bit feedback via a sidelink feedback channel. The operations of the method 1400 may be implemented by a UE or its components as described herein. For example, the operations of the method 1400 may be performed by a UE 115 as described with reference to FIGS. 1-12. In some implementations, a UE may execute a set of instructions to control the functional elements of the UE to perform the described functions. Additionally, or alternatively, the UE may perform aspects of the described functions using special-purpose hardware.

At 1405, the method may include transmitting, to a first UE from a second UE, one or more sidelink data messages. The operations of 1405 may be performed in accordance with examples as disclosed herein. In some implementations, aspects of the operations of 1405 may be performed by a communications manager 1220 as described with reference to FIG. 12.

At 1410, the method may include receiving, from the first UE over a set of multiple resource blocks of a sidelink feedback channel resource, a feedback message associated with the one or more sidelink data messages, the feedback message indicating a set of multiple feedback bits associated with the one or more sidelink data messages. The operations of 1410 may be performed in accordance with examples as disclosed herein. In some implementations, aspects of the operations of 1410 may be performed by a communications manager 1220 as described with reference to FIG. 12.

At 1415, the method may include communicating with the first UE in accordance with the set of multiple feedback bits associated with the one or more sidelink data messages. The operations of 1415 may be performed in accordance with examples as disclosed herein. In some implementations, aspects of the operations of 1415 may be performed by a communications manager 1220 as described with reference to FIG. 12.

The following provides an overview of some aspects of the present disclosure:

Aspect 1: A method for wireless communication at a first UE, including: receiving, from a second UE, one or more control signals scheduling one or more sidelink data messages; transmitting, to the second UE over a set of multiple resource blocks of a sidelink feedback channel resource, a feedback message associated with the one or more sidelink data messages, the feedback message indicating a set of multiple feedback bits associated with the one or more sidelink data messages; and communicating with the second UE in accordance with the set of multiple feedback bits associated with the one or more sidelink data messages.

Aspect 2: The method of aspect 1, further including: applying a different cyclic shift to each sequence of a set of multiple sequences to indicate a positive ACK or a NACK for that sequence, where each sequence of the set of multiple sequences corresponds to one of the set of multiple resource blocks of the sidelink feedback channel resource, and where transmitting the feedback message includes transmitting the cyclically shifted set of multiple sequences over the set of multiple resource blocks.

Aspect 3: The method of aspect 2, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 4: The method of any of aspects 2 or 3, where each sequence of the set of multiple sequences is associated with a same base sequence.

Aspect 5: The method of aspect 1, further including: applying a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where transmitting the feedback message includes transmitting the cyclically shifted single sequence over the set of multiple resource blocks.

Aspect 6: The method of aspect 5, where a quantity of base sequences associated with the single sequence corresponds to the length of the single sequence; and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 7: The method of aspect 6, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 8: The method of any of aspects 6 or 7, where different base sequence and cyclic shift combinations correspond to different bit values of the set of multiple feedback bits; and the different bit values correspond to different permutations of one or both of ACKs and NACKs.

Aspect 9: The method of any of aspects 1-8, further including: applying a coding scheme to the set of multiple feedback bits in accordance with a quantity of the set of multiple feedback bits; and multiplexing the set of multiple feedback bits with a DMRS in a symbol of the sidelink feedback channel resource, where transmitting the feedback message includes transmitting a coded set of multiple feedback bits multiplexed with the DMRS.

Aspect 10: The method of aspect 9, where applying the coding scheme to the set of multiple feedback bits includes: applying a Reed-Muller code to the set of multiple feedback bits if the quantity of the set of multiple feedback bits is less than or equal to a threshold quantity of feedback bits; or segmenting the set of multiple feedback bits into multiple segments of feedback bits if the quantity of the set of multiple feedback bits is greater than the threshold quantity of feedback bits and applying the Reed-Muller code to each of the multiple segments of feedback bits independently.

Aspect 11: The method of aspect 9, where applying the coding scheme to the set of multiple feedback bits includes: refraining from adding one or more CRC bits to the set of multiple feedback bits and applying a Reed-Muller code to the set of multiple feedback bits if the quantity of the set of multiple feedback bits is less than or equal to a threshold quantity of feedback bits; or adding the one or more CRC bits to the set of multiple feedback bits and applying a polar code to the set of multiple feedback bits if the quantity of the set of multiple feedback bits is greater than the threshold quantity of feedback bits.

Aspect 12: The method of any of aspects 1-11, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 13: The method of aspect 12, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 14: The method of aspect 13, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 15: The method of any of aspects 13 or 14, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 16: The method of any of aspects 1-15, further including: receiving multiple sidelink data messages in accordance with monitoring for the one or more sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 17: A method for wireless communication, including: transmitting, to a first UE from a second UE, one or more sidelink data messages; receiving, from the first UE over a set of multiple resource blocks of a sidelink feedback channel resource, a feedback message associated with the one or more sidelink data messages, the feedback message indicating a set of multiple feedback bits associated with the one or more sidelink data messages; and communicating with the first UE in accordance with the set of multiple feedback bits associated with the one or more sidelink data messages.

Aspect 18: The method of aspect 17, further including: decoding the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where receiving the feedback message is associated with decoding the cyclically shifted set of multiple sequences over the set of multiple resource blocks.

Aspect 19: The method of aspect 18, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 20: The method of any of aspects 18 or 19, where each sequence of the set of multiple sequences is associated with a same base sequence.

Aspect 21: The method of aspect 17, further including: decoding the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where receiving the feedback message is associated with decoding the cyclically shifted single sequence over the set of multiple resource blocks.

Aspect 22: The method of aspect 21, where a quantity of base sequences associated with the single sequence corresponds to the length of the single sequence and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 23: The method of aspect 22, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 24: The method of any of aspects 22 or 23, where different base sequence and cyclic shift combinations correspond to different bit values of the set of multiple feedback bits; and the different bit values correspond to different permutations of one or both of ACKs and NACKs.

Aspect 25: The method of any of aspects 17-24, further including: demultiplexing the set of multiple feedback bits from a DMRS in a symbol of the sidelink feedback channel resource; and decoding the feedback message using a coding scheme, applied to the set of multiple feedback bits, in accordance with a quantity of the set of multiple feedback bits, where receiving the feedback message is associated with decoding the feedback message using the coding scheme.

Aspect 26: The method of aspect 25, where decoding the feedback message using the coding scheme includes: decoding the set of multiple feedback bits using a Reed-Muller code if the quantity of the set of multiple feedback bits is less than or equal to a threshold quantity of feedback bits; or segmenting the set of multiple feedback bits into multiple segments of feedback bits and decoding the multiple segments of feedback bits independently using the Reed-Muller code if the quantity of the set of multiple feedback bits is greater than the threshold quantity of feedback bits.

Aspect 27: The method of aspect 25, where the set of multiple feedback bits exclude one or more CRC bits and are coded in accordance with a Reed-Muller code if the quantity of the set of multiple feedback bits is less than or equal to a threshold quantity of feedback bits, or the set of multiple feedback bits include one or more CRC bits and are coded in accordance with a polar code if the quantity of the set of multiple feedback bits is greater than the threshold quantity of feedback bits.

Aspect 28: The method of any of aspects 17-27, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 29: The method of aspect 28, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 30: The method of aspect 29, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 31: The method of any of aspects 29 or 30, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 32: The method of any of aspects 17-31, further including: transmitting multiple sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 33: An apparatus for wireless communication at a first UE, including: an interface configured to: obtain, from a second UE, one or more control signals scheduling one or more sidelink data messages; output, to the second UE over a set of multiple resource blocks of a sidelink feedback channel resource, a feedback message associated with the one or more sidelink data messages, the feedback message indicating a set of multiple feedback bits associated with the one or more sidelink data messages; and communicate with the second UE in accordance with the set of multiple feedback bits associated with the one or more sidelink data messages.

Aspect 34: The apparatus of aspect 33, where a processing system is configured to: apply a different cyclic shift to each sequence of a set of multiple sequences to indicate a positive ACK or a NACK for that sequence, where each sequence of the set of multiple sequences corresponds to one of the set of multiple resource blocks of the sidelink feedback channel resource, and where outputting the feedback message includes outputting the cyclically shifted set of multiple sequences over the set of multiple resource blocks.

Aspect 35: The apparatus of aspect 34, where: each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 36: The apparatus of any of aspects 34 or 35, where each sequence of the set of multiple sequences is associated with a same base sequence.

Aspect 37: The apparatus of aspect 33, where a processing system is configured to: apply a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where outputting the feedback message includes outputting the cyclically shifted single sequence over the set of multiple resource blocks.

Aspect 38: The apparatus of aspect 37, where: a quantity of base sequences associated with the single sequence corresponds to the length of the single sequence; and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 39: The apparatus of aspect 38, where: each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 40: The apparatus of any of aspects 38 or 39, where different base sequence and cyclic shift combinations correspond to different bit values of the set of multiple feedback bits; and the different bit values correspond to different permutations of one or both of ACKs and NACKs.

Aspect 41: The apparatus of any of aspects 33-40, where a processing system is configured to: apply a coding scheme to the set of multiple feedback bits in accordance with a quantity of the set of multiple feedback bits; and multiplex the set of multiple feedback bits with a DMRS in a symbol of the sidelink feedback channel resource, where outputting the feedback message includes outputting a coded set of multiple feedback bits multiplexed with the DMRS.

Aspect 42: The apparatus of aspect 41, where, to apply the coding scheme to the set of multiple feedback bits, the processing system is further configured to: apply a Reed-Muller code to the set of multiple feedback bits if the quantity of the set of multiple feedback bits is less than or equal to a threshold quantity of feedback bits; or segment the set of multiple feedback bits into multiple segments of feedback bits if the quantity of the set of multiple feedback bits is greater than the threshold quantity of feedback bits and applying the Reed-Muller code to each of the multiple segments of feedback bits independently.

Aspect 43: The apparatus of aspect 41, where, to apply the coding scheme to the set of multiple feedback bits, the processing system is further configured to: refrain from adding one or more CRC bits to the set of multiple feedback bits and applying a Reed-Muller code to the set of multiple feedback bits if the quantity of the set of multiple feedback bits is less than or equal to a threshold quantity of feedback bits; or add the one or more CRC bits to the set of multiple feedback bits and applying a polar code to the set of multiple feedback bits if the quantity of the set of multiple feedback bits is greater than the threshold quantity of feedback bits.

Aspect 44: The apparatus of any of aspects 33-43, where: the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 45: The apparatus of aspect 44, where: a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair; and the quantity of RBGs for each subchannel and slot pair corresponds to a quantity of a set of resource blocks for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 46: The apparatus of aspect 45, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 47: The apparatus of any of aspects 45 or 46, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 48: The apparatus of any of aspects 33-47, where the interface is further configured to: obtain multiple sidelink data messages in accordance with monitoring for the one or more sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 49: An apparatus for wireless communication, including: an interface configured to: output, to a first UE from a second UE, one or more sidelink data messages; obtain, from the first UE over a set of multiple resource blocks of a sidelink feedback channel resource, a feedback message associated with the one or more sidelink data messages, the feedback message indicating a set of multiple feedback bits associated with the one or more sidelink data messages; and communicate with the first UE in accordance with the set of multiple feedback bits associated with the one or more sidelink data messages.

Aspect 50: The apparatus of aspect 49, where a processing system is configured to: decode the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where obtaining the feedback message is associated with decoding the cyclically shifted set of multiple sequences over the set of multiple resource blocks.

Aspect 51: The apparatus of aspect 50, where: each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 52: The apparatus of any of aspects 50 or 51, where each sequence of the set of multiple sequences is associated with a same base sequence.

Aspect 53: The apparatus of aspect 49, where a processing system is configured to: decode the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where obtaining the feedback message is associated with decoding the cyclically shifted single sequence over the set of multiple resource blocks.

Aspect 54: The apparatus of aspect 53, where: a quantity of base sequences associated with the single sequence corresponds to the length of the single sequence and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 55: The apparatus of aspect 54, where: each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 56: The apparatus of any of aspects 54 or 55, where different base sequence and cyclic shift combinations correspond to different bit values of the set of multiple feedback bits; and the different bit values correspond to different permutations of one or both of ACKs and NACKs.

Aspect 57: The apparatus of any of aspects 49-56, where a processing system is configured to: demultiplex the set of multiple feedback bits from a DMRS in a symbol of the sidelink feedback channel resource; and decode the feedback message using a coding scheme, applied to the set of multiple feedback bits, in accordance with a quantity of the set of multiple feedback bits, where obtaining the feedback message is associated with decoding the feedback message using the coding scheme.

Aspect 58: The apparatus of aspect 57, where, to decode the feedback message using the coding scheme, the processing system is further configured to: decode the set of multiple feedback bits using a Reed-Muller code if the quantity of the set of multiple feedback bits is less than or equal to a threshold quantity of feedback bits; or segment the set of multiple feedback bits into multiple segments of feedback bits and decoding the multiple segments of feedback bits independently using the Reed-Muller code if the quantity of the set of multiple feedback bits is greater than the threshold quantity of feedback bits.

Aspect 59: The apparatus of aspect 57, where the set of multiple feedback bits exclude one or more CRC bits and are coded in accordance with a Reed-Muller code if the quantity of the set of multiple feedback bits is less than or equal to a threshold quantity of feedback bits, or the set of multiple feedback bits include one or more CRC bits and are coded in accordance with a polar code if the quantity of the set of multiple feedback bits is greater than the threshold quantity of feedback bits.

Aspect 60: The apparatus of any of aspects 49-59, where: the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 61: The apparatus of aspect 60, where: a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair; and the quantity of RBGs for each subchannel and slot pair corresponds to a quantity of a set of resource blocks for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 62: The apparatus of aspect 61, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 63: The apparatus of any of aspects 61 or 62, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 64: The apparatus of any of aspects 49-63, where the interface is further configured to: output multiple sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 65: An apparatus for wireless communication at a first UE, including: a processor; memory coupled with the processor; and instructions stored in the memory and executable by the processor to cause the apparatus to: receive, from a second UE, one or more control signals scheduling one or more sidelink data messages; transmit, to the second UE over a set of multiple resource blocks of a sidelink feedback channel resource, a feedback message associated with the one or more sidelink data messages, the feedback message indicating a set of multiple feedback bits associated with the one or more sidelink data messages; and communicate with the second UE in accordance with the set of multiple feedback bits associated with the one or more sidelink data messages.

Aspect 66: The apparatus of aspect 65, where the instructions are further executable by the processor to cause the apparatus to: apply a different cyclic shift to each sequence of a set of multiple sequences to indicate a positive ACK or a NACK for that sequence, where each sequence of the set of multiple sequences corresponds to one of the set of multiple resource blocks of the sidelink feedback channel resource, and where transmitting the feedback message includes transmitting the cyclically shifted set of multiple sequences over the set of multiple resource blocks.

Aspect 67: The apparatus of aspect 66, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 68: The apparatus of any of aspects 66 or 67, where each sequence of the set of multiple sequences is associated with a same base sequence.

Aspect 69: The apparatus of aspect 65, where the instructions are further executable by the processor to cause the apparatus to: apply a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where transmitting the feedback message includes transmitting the cyclically shifted single sequence over the set of multiple resource blocks.

Aspect 70: The apparatus of aspect 69, where a quantity of base sequences associated with the single sequence corresponds to the length of the single sequence; and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 71: The apparatus of aspect 70, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 72: The apparatus of any of aspects 70 or 71, where different base sequence and cyclic shift combinations correspond to different bit values of the set of multiple feedback bits; and the different bit values correspond to different permutations of one or both of ACKs and NACKs.

Aspect 73: The apparatus of any of aspects 65-72, where the instructions are further executable by the processor to cause the apparatus to: apply a coding scheme to the set of multiple feedback bits in accordance with a quantity of the set of multiple feedback bits; and multiplex the set of multiple feedback bits with a DMRS in a symbol of the sidelink feedback channel resource, where transmitting the feedback message includes transmitting a coded set of multiple feedback bits multiplexed with the DMRS.

Aspect 74: The apparatus of aspect 73, where the instructions to apply the coding scheme to the set of multiple feedback bits are executable by the processor to cause the apparatus to: apply a Reed-Muller code to the set of multiple feedback bits if the quantity of the set of multiple feedback bits is less than or equal to a threshold quantity of feedback bits; or segment the set of multiple feedback bits into multiple segments of feedback bits if the quantity of the set of multiple feedback bits is greater than the threshold quantity of feedback bits and applying the Reed-Muller code to each of the multiple segments of feedback bits independently.

Aspect 75: The apparatus of aspect 73, where the instructions to apply the coding scheme to the set of multiple feedback bits are executable by the processor to cause the apparatus to: refrain from adding one or more CRC bits to the set of multiple feedback bits and applying a Reed-Muller code to the set of multiple feedback bits if the quantity of the set of multiple feedback bits is less than or equal to a threshold quantity of feedback bits; or add the one or more CRC bits to the set of multiple feedback bits and applying a polar code to the set of multiple feedback bits if the quantity of the set of multiple feedback bits is greater than the threshold quantity of feedback bits.

Aspect 76: The apparatus of any of aspects 65-75, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 77: The apparatus of aspect 76, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 78: The apparatus of aspect 77, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 79: The apparatus of any of aspects 77 or 78, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 80: The apparatus of any of aspects 65-79, where the instructions are further executable by the processor to cause the apparatus to: receive multiple sidelink data messages in accordance with monitoring for the one or more sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 81: An apparatus for wireless communication, including: a processor; memory coupled with the processor; and instructions stored in the memory and executable by the processor to cause the apparatus to: transmit, to a first UE from a second UE, one or more sidelink data messages; receive, from the first UE over a set of multiple resource blocks of a sidelink feedback channel resource, a feedback message associated with the one or more sidelink data messages, the feedback message indicating a set of multiple feedback bits associated with the one or more sidelink data messages; and communicate with the first UE in accordance with the set of multiple feedback bits associated with the one or more sidelink data messages.

Aspect 82: The apparatus of aspect 81, where the instructions are further executable by the processor to cause the apparatus to: decode the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where receiving the feedback message is associated with decoding the cyclically shifted set of multiple sequences over the set of multiple resource blocks.

Aspect 83: The apparatus of aspect 82, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 84: The apparatus of any of aspects 82 or 83, where each sequence of the set of multiple sequences is associated with a same base sequence.

Aspect 85: The apparatus of aspect 81, where the instructions are further executable by the processor to cause the apparatus to: decode the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where receiving the feedback message is associated with decoding the cyclically shifted single sequence over the set of multiple resource blocks.

Aspect 86: The apparatus of aspect 85, where a quantity of base sequences associated with the single sequence corresponds to the length of the single sequence and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 87: The apparatus of aspect 86, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 88: The apparatus of any of aspects 86 or 87, where different base sequence and cyclic shift combinations correspond to different bit values of the set of multiple feedback bits; and the different bit values correspond to different permutations of one or both of ACKs and NACKs.

Aspect 89: The apparatus of any of aspects 81-88, where the instructions are further executable by the processor to cause the apparatus to: demultiplex the set of multiple feedback bits from a DMRS in a symbol of the sidelink feedback channel resource; and decode the feedback message using a coding scheme, applied to the set of multiple feedback bits, in accordance with a quantity of the set of multiple feedback bits, where receiving the feedback message is associated with decoding the feedback message using the coding scheme.

Aspect 90: The apparatus of aspect 89, where the instructions to decode the feedback message using the coding scheme are executable by the processor to cause the apparatus to: decode the set of multiple feedback bits using a Reed-Muller code if the quantity of the set of multiple feedback bits is less than or equal to a threshold quantity of feedback bits; or segment the set of multiple feedback bits into multiple segments of feedback bits and decoding the multiple segments of feedback bits independently using the Reed-Muller code if the quantity of the set of multiple feedback bits is greater than the threshold quantity of feedback bits.

Aspect 91: The apparatus of aspect 89, where the set of multiple feedback bits exclude one or more CRC bits and are coded in accordance with a Reed-Muller code if the quantity of the set of multiple feedback bits is less than or equal to a threshold quantity of feedback bits, or the set of multiple feedback bits include one or more CRC bits and are coded in accordance with a polar code if the quantity of the set of multiple feedback bits is greater than the threshold quantity of feedback bits.

Aspect 92: The apparatus of any of aspects 81-91, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 93: The apparatus of aspect 92, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 94: The apparatus of aspect 93, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 95: The apparatus of any of aspects 93 or 94, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 96: The apparatus of any of aspects 81-95, where the instructions are further executable by the processor to cause the apparatus to: transmit multiple sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 97: An apparatus for wireless communication at a first UE, including: means for receiving, from a second UE, one or more control signals scheduling one or more sidelink data messages; means for transmitting, to the second UE over a set of multiple resource blocks of a sidelink feedback channel resource, a feedback message associated with the one or more sidelink data messages, the feedback message indicating a set of multiple feedback bits associated with the one or more sidelink data messages; and means for communicating with the second UE in accordance with the set of multiple feedback bits associated with the one or more sidelink data messages.

Aspect 98: The apparatus of aspect 97, further including: means for applying a different cyclic shift to each sequence of a set of multiple sequences to indicate a positive ACK or a NACK for that sequence, where each sequence of the set of multiple sequences corresponds to one of the set of multiple resource blocks of the sidelink feedback channel resource, and where transmitting the feedback message includes transmitting the cyclically shifted set of multiple sequences over the set of multiple resource blocks.

Aspect 99: The apparatus of aspect 98, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 100: The apparatus of any of aspects 98 or 99, where each sequence of the set of multiple sequences is associated with a same base sequence.

Aspect 101: The apparatus of aspect 97, further including: means for applying a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where transmitting the feedback message includes transmitting the cyclically shifted single sequence over the set of multiple resource blocks.

Aspect 102: The apparatus of aspect 101, where a quantity of base sequences associated with the single sequence corresponds to the length of the single sequence; and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 103: The apparatus of aspect 102, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 104: The apparatus of any of aspects 102 or 103, where different base sequence and cyclic shift combinations correspond to different bit values of the set of multiple feedback bits; and the different bit values correspond to different permutations of one or both of ACKs and NACKs.

Aspect 105: The apparatus of any of aspects 97-104, further including: means for applying a coding scheme to the set of multiple feedback bits in accordance with a quantity of the set of multiple feedback bits; and means for multiplexing the set of multiple feedback bits with a DMRS in a symbol of the sidelink feedback channel resource, where transmitting the feedback message includes transmitting a coded set of multiple feedback bits multiplexed with the DMRS.

Aspect 106: The apparatus of aspect 105, where the means for applying the coding scheme to the set of multiple feedback bits include: means for applying a Reed-Muller code to the set of multiple feedback bits if the quantity of the set of multiple feedback bits is less than or equal to a threshold quantity of feedback bits; or means for segmenting the set of multiple feedback bits into multiple segments of feedback bits if the quantity of the set of multiple feedback bits is greater than the threshold quantity of feedback bits and applying the Reed-Muller code to each of the multiple segments of feedback bits independently.

Aspect 107: The apparatus of aspect 105, where the means for applying the coding scheme to the set of multiple feedback bits include: means for refraining from adding one or more CRC bits to the set of multiple feedback bits and applying a Reed-Muller code to the set of multiple feedback bits if the quantity of the set of multiple feedback bits is less than or equal to a threshold quantity of feedback bits; or means for adding the one or more CRC bits to the set of multiple feedback bits and applying a polar code to the set of multiple feedback bits if the quantity of the set of multiple feedback bits is greater than the threshold quantity of feedback bits.

Aspect 108: The apparatus of any of aspects 97-107, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 109: The apparatus of aspect 108, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 110: The apparatus of aspect 109, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 111: The apparatus of any of aspects 109 or 110, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 112: The apparatus of any of aspects 97-111, further including: means for receiving multiple sidelink data messages in accordance with monitoring for the one or more sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 113: An apparatus for wireless communication, including: means for transmitting, to a first UE from a second UE, one or more sidelink data messages; means for receiving, from the first UE over a set of multiple resource blocks of a sidelink feedback channel resource, a feedback message associated with the one or more sidelink data messages, the feedback message indicating a set of multiple feedback bits associated with the one or more sidelink data messages; and means for communicating with the first UE in accordance with the set of multiple feedback bits associated with the one or more sidelink data messages.

Aspect 114: The apparatus of aspect 113, further including: means for decoding the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where receiving the feedback message is associated with decoding the cyclically shifted set of multiple sequences over the set of multiple resource blocks.

Aspect 115: The apparatus of aspect 114, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 116: The apparatus of any of aspects 114 or 115, where each sequence of the set of multiple sequences is associated with a same base sequence.

Aspect 117: The apparatus of aspect 113, further including: means for decoding the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where receiving the feedback message is associated with decoding the cyclically shifted single sequence over the set of multiple resource blocks.

Aspect 118: The apparatus of aspect 117, where a quantity of base sequences associated with the single sequence corresponds to the length of the single sequence and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 119: The apparatus of aspect 118, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 120: The apparatus of any of aspects 118 or 119, where different base sequence and cyclic shift combinations correspond to different bit values of the set of multiple feedback bits; and the different bit values correspond to different permutations of one or both of ACKs and NACKs.

Aspect 121: The apparatus of any of aspects 113-120, further including: means for demultiplexing the set of multiple feedback bits from a DMRS in a symbol of the sidelink feedback channel resource; and means for decoding the feedback message using a coding scheme, applied to the set of multiple feedback bits, in accordance with a quantity of the set of multiple feedback bits, where receiving the feedback message is associated with decoding the feedback message using the coding scheme.

Aspect 122: The apparatus of aspect 121, where the means for decoding the feedback message using the coding scheme include: means for decoding the set of multiple feedback bits using a Reed-Muller code if the quantity of the set of multiple feedback bits is less than or equal to a threshold quantity of feedback bits; or means for segmenting the set of multiple feedback bits into multiple segments of feedback bits and decoding the multiple segments of feedback bits independently using the Reed-Muller code if the quantity of the set of multiple feedback bits is greater than the threshold quantity of feedback bits.

Aspect 123: The apparatus of aspect 121, where the set of multiple feedback bits exclude one or more CRC bits and are coded in accordance with a Reed-Muller code if the quantity of the set of multiple feedback bits is less than or equal to a threshold quantity of feedback bits, or the set of multiple feedback bits include one or more CRC bits and are coded in accordance with a polar code if the quantity of the set of multiple feedback bits is greater than the threshold quantity of feedback bits.

Aspect 124: The apparatus of any of aspects 113-123, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 125: The apparatus of aspect 124, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 126: The apparatus of aspect 125, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 127: The apparatus of any of aspects 125 or 126, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 128: The apparatus of any of aspects 113-127, further including: means for transmitting multiple sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 129: A non-transitory computer-readable medium storing code for wireless communication at a first UE, the code including instructions executable by a processor to: receive, from a second UE, one or more control signals scheduling one or more sidelink data messages; transmit, to the second UE over a set of multiple resource blocks of a sidelink feedback channel resource, a feedback message associated with the one or more sidelink data messages, the feedback message indicating a set of multiple feedback bits associated with the one or more sidelink data messages; and communicate with the second UE in accordance with the set of multiple feedback bits associated with the one or more sidelink data messages.

Aspect 130: The non-transitory computer-readable medium of aspect 129, where the instructions are further executable by the processor to: apply a different cyclic shift to each sequence of a set of multiple sequences to indicate a positive ACK or a NACK for that sequence, where each sequence of the set of multiple sequences corresponds to one of the set of multiple resource blocks of the sidelink feedback channel resource, and where transmitting the feedback message includes transmitting the cyclically shifted set of multiple sequences over the set of multiple resource blocks.

Aspect 131: The non-transitory computer-readable medium of aspect 130, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 132: The non-transitory computer-readable medium of any of aspects 130 or 131, where each sequence of the set of multiple sequences is associated with a same base sequence.

Aspect 133: The non-transitory computer-readable medium of aspect 129, where the instructions are further executable by the processor to: apply a cyclic shift, of a set of multiple cyclic shifts, to a single sequence spanning the set of multiple resource blocks to indicate the set of multiple feedback bits, where a length of the single sequence corresponds to a product of a quantity of the set of multiple resource blocks and a quantity of subcarriers in each resource block, and where transmitting the feedback message includes transmitting the cyclically shifted single sequence over the set of multiple resource blocks.

Aspect 134: The non-transitory computer-readable medium of aspect 133, where a quantity of base sequences associated with the single sequence corresponds to the length of the single sequence; and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 135: The non-transitory computer-readable medium of aspect 134, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 136: The non-transitory computer-readable medium of any of aspects 134 or 135, where different base sequence and cyclic shift combinations correspond to different bit values of the set of multiple feedback bits; and the different bit values correspond to different permutations of one or both of ACKs and NACKs.

Aspect 137: The non-transitory computer-readable medium of any of aspects 129-136, where the instructions are further executable by the processor to: apply a coding scheme to the set of multiple feedback bits in accordance with a quantity of the set of multiple feedback bits; and multiplex the set of multiple feedback bits with a DMRS in a symbol of the sidelink feedback channel resource, where transmitting the feedback message includes transmitting a coded set of multiple feedback bits multiplexed with the DMRS.

Aspect 138: The non-transitory computer-readable medium of aspect 137, where the instructions to apply the coding scheme to the set of multiple feedback bits are executable by the processor to: apply a Reed-Muller code to the set of multiple feedback bits if the quantity of the set of multiple feedback bits is less than or equal to a threshold quantity of feedback bits; or segment the set of multiple feedback bits into multiple segments of feedback bits if the quantity of the set of multiple feedback bits is greater than the threshold quantity of feedback bits and applying the Reed-Muller code to each of the multiple segments of feedback bits independently.

Aspect 139: The non-transitory computer-readable medium of aspect 137, where the instructions to apply the coding scheme to the set of multiple feedback bits are executable by the processor to: refrain from adding one or more CRC bits to the set of multiple feedback bits and applying a Reed-Muller code to the set of multiple feedback bits if the quantity of the set of multiple feedback bits is less than or equal to a threshold quantity of feedback bits; or add the one or more CRC bits to the set of multiple feedback bits and applying a polar code to the set of multiple feedback bits if the quantity of the set of multiple feedback bits is greater than the threshold quantity of feedback bits.

Aspect 140: The non-transitory computer-readable medium of any of aspects 129-139, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 141: The non-transitory computer-readable medium of aspect 140, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 142: The non-transitory computer-readable medium of aspect 141, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 143: The non-transitory computer-readable medium of any of aspects 141 or 142, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 144: The non-transitory computer-readable medium of any of aspects 129-143, where the instructions are further executable by the processor to: receive multiple sidelink data messages in accordance with monitoring for the one or more sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

Aspect 145: A non-transitory computer-readable medium storing code for wireless communication, the code including instructions executable by a processor to: transmit, to a first UE from a second UE, one or more sidelink data messages; receive, from the first UE over a set of multiple resource blocks of a sidelink feedback channel resource, a feedback message associated with the one or more sidelink data messages, the feedback message indicating a set of multiple feedback bits associated with the one or more sidelink data messages; and communicate with the first UE in accordance with the set of multiple feedback bits associated with the one or more sidelink data messages.

Aspect 146: The non-transitory computer-readable medium of aspect 145, where the instructions are further executable by the processor to: decode the feedback message using a different cyclic shift on each sequence of a set of multiple sequences to identify a positive ACK or a NACK for that sequence, where each sequence of the set of multiple sequences corresponds to one of the set of multiple resource blocks of the sidelink feedback channel resource, and where receiving the feedback message is associated with decoding the cyclically shifted set of multiple sequences over the set of multiple resource blocks.

Aspect 147: The non-transitory computer-readable medium of aspect 146, where each sequence of the set of multiple sequences is associated with a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

Aspect 148: The non-transitory computer-readable medium of any of aspects 146 or 147, where each sequence of the set of multiple sequences is associated with a same base sequence.

Aspect 149: The non-transitory computer-readable medium of aspect 145, where the instructions are further executable by the processor to: decode the feedback message using a cyclic shift, of a set of multiple cyclic shifts, on a single sequence spanning the set of multiple resource blocks to identify the set of multiple feedback bits, where a length of the single sequence corresponds to a product of a quantity of the set of multiple resource blocks and a quantity of subcarriers in each resource block, and where receiving the feedback message is associated with decoding the cyclically shifted single sequence over the set of multiple resource blocks.

Aspect 150: The non-transitory computer-readable medium of aspect 149, where a quantity of base sequences associated with the single sequence corresponds to the length of the single sequence and a total quantity of sequences corresponds to a product of the quantity of the set of multiple resource blocks, a quantity of subcarriers in each resource block, and a quantity of the set of multiple cyclic shifts; and the total quantity of sequences are divided into a set of multiple groups in accordance with the total quantity of sequences and a quantity of the set of multiple feedback bits.

Aspect 151: The non-transitory computer-readable medium of aspect 150, where each group of the set of multiple groups is allocated a subset of sequences, a quantity of the subset of sequences corresponding to a quantity of sequences capable of conveying the quantity of the set of multiple feedback bits divided by the quantity of the set of multiple cyclic shifts; and the single sequence is from a group allocated for the first UE.

Aspect 152: The non-transitory computer-readable medium of any of aspects 150 or 151, where different base sequence and cyclic shift combinations correspond to different bit values of the set of multiple feedback bits; and the different bit values correspond to different permutations of one or both of ACKs and NACKs.

Aspect 153: The non-transitory computer-readable medium of any of aspects 145-152, where the instructions are further executable by the processor to: demultiplex the set of multiple feedback bits from a DMRS in a symbol of the sidelink feedback channel resource; and decode the feedback message using a coding scheme, applied to the set of multiple feedback bits, in accordance with a quantity of the set of multiple feedback bits, where receiving the feedback message is associated with decoding the feedback message using the coding scheme.

Aspect 154: The non-transitory computer-readable medium of aspect 153, where the instructions to decode the feedback message using the coding scheme are executable by the processor to: decode the set of multiple feedback bits using a Reed-Muller code if the quantity of the set of multiple feedback bits is less than or equal to a threshold quantity of feedback bits; or segment the set of multiple feedback bits into multiple segments of feedback bits and decoding the multiple segments of feedback bits independently using the Reed-Muller code if the quantity of the set of multiple feedback bits is greater than the threshold quantity of feedback bits.

Aspect 155: The non-transitory computer-readable medium of aspect 153, where the set of multiple feedback bits exclude one or more CRC bits and are coded in accordance with a Reed-Muller code if the quantity of the set of multiple feedback bits is less than or equal to a threshold quantity of feedback bits, or the set of multiple feedback bits include one or more CRC bits and are coded in accordance with a polar code if the quantity of the set of multiple feedback bits is greater than the threshold quantity of feedback bits.

Aspect 156: The non-transitory computer-readable medium of any of aspects 145-155, where the sidelink feedback channel resource is selected from a set of multiple sidelink feedback channel resources in a resource pool; and the resource pool is associated with one or more of a quantity of the set of multiple resource blocks, an upper limit quantity of feedback bits per sidelink feedback channel resource, and a quantity of cyclic shifts per resource pool.

Aspect 157: The non-transitory computer-readable medium of aspect 156, where a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of RBGs for each subchannel and slot pair, and the quantity of RBGs for each subchannel and slot pair corresponds to a quantity of a set of PRBs for the sidelink feedback channel in a slot divided by the quantity of the set of multiple resource blocks, a quantity of sidelink shared channel slots corresponding to a sidelink feedback channel slot, and a quantity of a set of multiple subchannels.

Aspect 158: The non-transitory computer-readable medium of aspect 157, where the second value associated with a quantity of dimensions in which the quantity of sidelink feedback channel resources can be multiplexed corresponds to a quantity of cyclic shift pairs for differentiating between ACKs and NACKs if the set of multiple feedback bits are conveyed via a set of multiple sequences, or corresponds to a quantity of a set of multiple groups associated with a total quantity of sequences divided by a quantity of sequences capable of conveying a quantity of the set of multiple feedback bits if the set of multiple feedback bits are conveyed via a single sequence, or corresponds to one if the set of multiple feedback bits are conveyed via an application of a coding scheme in accordance with a quantity of the set of multiple feedback bits.

Aspect 159: The non-transitory computer-readable medium of any of aspects 157 or 158, where an index of the sidelink feedback channel resource corresponds to a remainder of a summation of a physical source identifier and a zero value or a value associated with an identify of the first UE divided by the quantity of sidelink feedback channel resources available for multiplexing.

Aspect 160: The non-transitory computer-readable medium of any of aspects 145-159, where the instructions are further executable by the processor to: transmit multiple sidelink data messages, where the sidelink feedback channel resource carrying the set of multiple feedback bits is selected in accordance with a sidelink shared channel carrying a sidelink data message of the multiple sidelink data messages scheduled by a last, in time, SCI message.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A first user equipment (UE), comprising:

a processing system that includes one or more processors and one or more code-storing memories coupled with the one or more processors, the processing system configured to cause the first UE to:

receive, from a second UE, one or more control signals scheduling one or more sidelink data messages;

transmit, to the second UE over a plurality of resource blocks of a sidelink feedback channel resource, a feedback message associated with the one or more sidelink data messages, the feedback message indicating a plurality of feedback bits associated with the one or more sidelink data messages; and communicate with the second UE in accordance with the plurality of feedback bits associated with the one or more sidelink data messages, wherein:

the sidelink feedback channel resource is selected from a plurality of sidelink feedback channel resources in a resource pool; and the resource pool is associated with one or more of a quantity of the plurality of resource blocks, an upper limit quantity of feedback bits per sidelink feedback channel resource, and a quantity of cyclic shifts per resource pool.

2. The first UE of claim 1, wherein the processing system is further configured to cause the first UE to:

apply a different cyclic shift to each sequence of a plurality of sequences to indicate a positive acknowledgement (ACK) or a negative ACK (NACK) for that sequence, wherein each sequence of the plurality of sequences corresponds to one of the plurality of resource blocks of the sidelink feedback channel resource, and wherein transmitting the feedback message comprises transmitting the cyclically shifted plurality of sequences over the plurality of resource blocks.

3. The first UE of claim 2, wherein:

each sequence of the plurality of sequences is associated with a same base sequence and a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

4. The first UE of claim 1, wherein the processing system is further configured to cause the first UE to:

apply a cyclic shift, of a plurality of cyclic shifts, to a single sequence spanning the plurality of resource blocks to indicate the plurality of feedback bits, wherein a length of the single sequence corresponds to a product of a quantity of the plurality of resource blocks and a quantity of subcarriers in each resource block, and wherein transmitting the feedback message comprises transmitting the cyclically shifted single sequence over the plurality of resource blocks.

5. The first UE of claim 4, wherein:

a quantity of base sequences associated with the single sequence corresponds to the length of the single sequence; and a total quantity of sequences corresponds to a product of the quantity of the plurality of resource blocks, a quantity of subcarriers in each resource block, and a quantity of the plurality of cyclic shifts; and different base sequence and cyclic shift combinations correspond to different bit values of the plurality of feedback bits, the different bit values corresponding to different permutations of one or both of acknowledgements (ACKs) and negative ACKs (NACKs).

6. The first UE of claim 1, wherein the processing system is further configured to cause the first UE to:

apply a coding scheme to the plurality of feedback bits in accordance with a quantity of the plurality of feedback bits; and multiplex the plurality of feedback bits with a demodulation reference signal (DMRS) in a symbol of the sidelink feedback channel resource, wherein transmitting the feedback message comprises transmitting a coded plurality of feedback bits multiplexed with the DMRS.

7. The first UE of claim 6, wherein, to apply the coding scheme to the plurality of feedback bits, the processing system is further configured to cause the first UE to:

apply a Reed-Muller code to the plurality of feedback bits if the quantity of the plurality of feedback bits is less than or equal to a threshold quantity of feedback bits; or segment the plurality of feedback bits into multiple segments of feedback bits if the quantity of the plurality of feedback bits is greater than the threshold quantity of feedback bits and apply the Reed-Muller code to each of the multiple segments of feedback bits independently.

8. The first UE of claim 1, wherein:

a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of resource block groups (RBGs) for each subchannel and slot pair; and the quantity of RBGs for each subchannel and slot pair corresponds to a quantity of a set of resource blocks for the sidelink feedback channel in a slot divided by the quantity of the plurality of resource blocks, a quantity of sidelink shared channel slots corresponding to a sidelink feedback channel slot, and a quantity of a plurality of subchannels; and an index of the sidelink feedback channel resource corresponds to a remainder of a summation of a physical source identifier and a zero value or a value associated with an identify of the first UE divided by the quantity of sidelink feedback channel resources available for multiplexing.

9. The first UE of claim 1, wherein the processing system is further configured to cause the first UE to:

receive multiple sidelink data messages in accordance with monitoring for the one or more sidelink data messages, wherein the sidelink feedback channel resource carrying the plurality of feedback bits is selected in accordance with a sidelink shared channel carrying a sidelink data message of the multiple sidelink data messages scheduled by a last, in time, sidelink control information (SCI) message.

10. A second user equipment (UE), comprising:

a processing system that includes one or more processors and one or more code-storing memories coupled with the one or more processors, the processing system configured to cause the second UE to:

transmit, to a first user equipment (UE), one or more sidelink data messages;

receive, from the first UE over a plurality of resource blocks of a sidelink feedback channel resource, a feedback message associated with the one or more sidelink data messages, the feedback message indicating a plurality of feedback bits associated with the one or more sidelink data messages; and communicate with the first UE in accordance with the plurality of feedback bits associated with the one or more sidelink data messages, wherein:

the sidelink feedback channel resource is selected from a plurality of sidelink feedback channel resources in a resource pool; and the resource pool is associated with one or more of a quantity of the plurality of resource blocks, an upper limit quantity of feedback bits per sidelink feedback channel resource, and a quantity of cyclic shifts per resource pool.

11. The second UE of claim 10, wherein the processing system is further configured to cause the second UE to:

decode the feedback message using a different cyclic shift on each sequence of a plurality of sequences to identify a positive acknowledgement (ACK) or a negative ACK (NACK) for that sequence, wherein each sequence of the plurality of sequences corresponds to one of the plurality of resource blocks of the sidelink feedback channel resource, and wherein receiving the feedback message is associated with decoding the cyclically shifted plurality of sequences over the plurality of resource blocks.

12. The second UE of claim 11, wherein:

each sequence of the plurality of sequences is associated with a same base sequence and a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

13. The second UE of claim 10, wherein the processing system is further configured to cause the second UE to:

decode the feedback message using a cyclic shift, of a plurality of cyclic shifts, on a single sequence spanning the plurality of resource blocks to identify the plurality of feedback bits, wherein a length of the single sequence corresponds to a product of a quantity of the plurality of resource blocks and a quantity of subcarriers in each resource block, and wherein receiving the feedback message is associated with decoding the cyclically shifted single sequence over the plurality of resource blocks.

14. The second UE of claim 13, wherein:

a quantity of base sequences associated with the single sequence corresponds to the length of the single sequence; and a total quantity of sequences corresponds to a product of the quantity of the plurality of resource blocks, a quantity of subcarriers in each resource block, and a quantity of the plurality of cyclic shifts; and different base sequence and cyclic shift combinations correspond to different bit values of the plurality of feedback bits, the different bit values corresponding to different permutations of one or both of acknowledgements (ACKs) and negative ACKs (NACKs).

15. The second UE of claim 10, wherein the processing system is further configured to cause the second UE to:

demultiplex the plurality of feedback bits from a demodulation reference signal (DMRS) in a symbol of the sidelink feedback channel resource; and decode the feedback message using a coding scheme, applied to the plurality of feedback bits, in accordance with a quantity of the plurality of feedback bits, wherein receiving the feedback message is associated with decoding the feedback message using the coding scheme.

16. The second UE of claim 15, wherein, to decode the feedback message using the coding scheme, the processing system is further configured to cause the second UE to:

decode the plurality of feedback bits using a Reed-Muller code if the quantity of the plurality of feedback bits is less than or equal to a threshold quantity of feedback bits; or segment the plurality of feedback bits into multiple segments of feedback bits and decode the multiple segments of feedback bits independently using the Reed-Muller code if the quantity of the plurality of feedback bits is greater than the threshold quantity of feedback bits.

17. The second UE of claim 10, wherein:

a quantity of sidelink feedback channel resources available for multiplexing in a sidelink feedback channel corresponds to a product of a first value associated with indicating whether the resource pool is shared, a second value associated with a quantity of dimensions in which the quantity of sidelink feedback channel resources can be multiplexed, and a third value associated with a quantity of resource block groups (RBGs) for each subchannel and slot pair; and the quantity of RBGs for each subchannel and slot pair corresponds to a quantity of a set of resource blocks for the sidelink feedback channel in a slot divided by the quantity of the plurality of resource blocks, a quantity of sidelink shared channel slots corresponding to a sidelink feedback channel slot, and a quantity of a plurality of subchannels; and an index of the sidelink feedback channel resource corresponds to a remainder of a summation of a physical source identifier and a zero value or a value associated with an identify of the first UE divided by the quantity of sidelink feedback channel resources available for multiplexing.

18. The second UE of claim 10, wherein the processing system is further configured to cause the second UE to:

transmit multiple sidelink data messages, wherein the sidelink feedback channel resource carrying the plurality of feedback bits is selected in accordance with a sidelink shared channel carrying a sidelink data message of the multiple sidelink data messages scheduled by a last, in time, sidelink control information (SCI) message.

19. A method for wireless communication at a first user equipment (UE), comprising:

receiving, from a second UE, one or more control signals scheduling one or more sidelink data messages;

transmitting, to the second UE over a plurality of resource blocks of a sidelink feedback channel resource, a feedback message associated with the one or more sidelink data messages, the feedback message indicating a plurality of feedback bits associated with the one or more sidelink data messages; and communicating with the second UE in accordance with the plurality of feedback bits associated with the one or more sidelink data messages, wherein the sidelink feedback channel resource is selected from a plurality of sidelink feedback channel resources in a resource pool; and the resource pool is associated with one or more of a quantity of the plurality of resource blocks, an upper limit quantity of feedback bits per sidelink feedback channel resource, and a quantity of cyclic shifts per resource pool.

20. The method of claim 19, further comprising:

applying a different cyclic shift to each sequence of a plurality of sequences to indicate a positive acknowledgement (ACK) or a negative ACK (NACK) for that sequence, wherein each sequence of the plurality of sequences corresponds to one of the plurality of resource blocks of the sidelink feedback channel resource, and wherein transmitting the feedback message comprises transmitting the cyclically shifted plurality of sequences over the plurality of resource blocks.

21. The method of claim 20, wherein:

each sequence of the plurality of sequences is associated with a same base sequence and a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

22. The method of claim 19, further comprising:

applying a cyclic shift, of a plurality of cyclic shifts, to a single sequence spanning the plurality of resource blocks to indicate the plurality of feedback bits, wherein a length of the single sequence corresponds to a product of a quantity of the plurality of resource blocks and a quantity of subcarriers in each resource block, and wherein transmitting the feedback message comprises transmitting the cyclically shifted single sequence over the plurality of resource blocks.

23. The method of claim 19, further comprising:

applying a coding scheme to the plurality of feedback bits in accordance with a quantity of the plurality of feedback bits; and multiplexing the plurality of feedback bits with a demodulation reference signal (DMRS) in a symbol of the sidelink feedback channel resource, wherein transmitting the feedback message comprises transmitting a coded plurality of feedback bits multiplexed with the DMRS.

24. The method of claim 19, further comprising:

receiving multiple sidelink data messages in accordance with monitoring for the one or more sidelink data messages, wherein the sidelink feedback channel resource carrying the plurality of feedback bits is selected in accordance with a sidelink shared channel carrying a sidelink data message of the multiple sidelink data messages scheduled by a last, in time, sidelink control information (SCI) message.

25. A method for wireless communication, comprising:

transmitting, to a first user equipment (UE) from a second UE, one or more sidelink data messages;

receiving, from the first UE over a plurality of resource blocks of a sidelink feedback channel resource, a feedback message associated with the one or more sidelink data messages, the feedback message indicating a plurality of feedback bits associated with the one or more sidelink data messages; and communicating with the first UE in accordance with the plurality of feedback bits associated with the one or more sidelink data messages, wherein the sidelink feedback channel resource is selected from a plurality of sidelink feedback channel resources in a resource pool; and the resource pool is associated with one or more of a quantity of the plurality of resource blocks, an upper limit quantity of feedback bits per sidelink feedback channel resource, and a quantity of cyclic shifts per resource pool.

26. The method of claim 25, further comprising:

decoding the feedback message using a different cyclic shift on each sequence of a plurality of sequences to identify a positive acknowledgement (ACK) or a negative ACK (NACK) for that sequence, wherein each sequence of the plurality of sequences corresponds to one of the plurality of resource blocks of the sidelink feedback channel resource, and wherein receiving the feedback message is associated with decoding the cyclically shifted plurality of sequences over the plurality of resource blocks.

27. The method of claim 26, wherein:

each sequence of the plurality of sequences is associated with a same base sequence and a different cyclic shift pair; and an initial cyclic shift of that sequence in a first resource block is associated with a cyclic shift pair index and a quantity of cyclic shift pairs; and a first cyclic shift of a cyclic shift pair indicates an ACK and a second cyclic shift of the cyclic shift pair indicates a NACK.

28. The method of claim 25, further comprising:

decoding the feedback message using a cyclic shift, of a plurality of cyclic shifts, on a single sequence spanning the plurality of resource blocks to identify the plurality of feedback bits, wherein a length of the single sequence corresponds to a product of a quantity of the plurality of resource blocks and a quantity of subcarriers in each resource block, and wherein receiving the feedback message is associated with decoding the cyclically shifted single sequence over the plurality of resource blocks.

29. The method of claim 25, further comprising:

demultiplexing the plurality of feedback bits from a demodulation reference signal (DMRS) in a symbol of the sidelink feedback channel resource; and decoding the feedback message using a coding scheme, applied to the plurality of feedback bits, in accordance with a quantity of the plurality of feedback bits, wherein receiving the feedback message is associated with decoding the feedback message using the coding scheme.

30. The method of claim 25, further comprising:

transmitting multiple sidelink data messages, wherein the sidelink feedback channel resource carrying the plurality of feedback bits is selected in accordance with a sidelink shared channel carrying a sidelink data message of the multiple sidelink data messages scheduled by a last, in time, sidelink control information (SCI) message.

* * * * *